US012708804B2

(12) United States Patent
O'Neil et al.

(10) Patent No.: US 12,708,804 B2
(45) Date of Patent: Aug. 18, 2026

(54) FIRE RATED CLEANOUT COVER ASSEMBLIES

(71) Applicant: RELIANCE WORLDWIDE CORPORATION, Atlanta, GA (US)

(72) Inventors: Virgil O'Neil, Atlanta, GA (US); Jeffrey Eric Hamilton, Menifee, CA (US); Ryan Jeffrey Miller, La Mesa, CA (US)

(73) Assignee: Reliance Worldwide Corporation, Atlanta, GA (US)

( * ) Notice: Subject to any disclaimer, the term of this patent is extended or adjusted under 35 U.S.C. 154(b) by 206 days.

(21) Appl. No.: 18/294,216

(22) PCT Filed: Aug. 3, 2022

(86) PCT No.: PCT/US2022/074458
§ 371 (c)(1),
(2) Date: Feb. 1, 2024

(87) PCT Pub. No.: WO2023/015201
PCT Pub. Date: Feb. 9, 2023

(65) Prior Publication Data

US 2024/0325799 A1 Oct. 3, 2024

Related U.S. Application Data

(60) Provisional application No. 63/229,314, filed on Aug. 4, 2021.

(51) Int. Cl.
*A62C 2/06* (2006.01)

(52) U.S. Cl.
CPC .................................... *A62C 2/065* (2013.01)

(58) Field of Classification Search
CPC ...................................................... A62C 2/065
See application file for complete search history.

(56) References Cited

U.S. PATENT DOCUMENTS

| | | | | |
|---|---|---|---|---|
| 4,432,465 A * | 2/1984 | Wuertz | F16L 55/10 | 277/933 |
| 4,951,914 A * | 8/1990 | Meyers | F16L 5/10 | 277/606 |

(Continued)

FOREIGN PATENT DOCUMENTS

| | | | | |
|---|---|---|---|---|
| DE | 102008022583 A1 * | 11/2009 | F16L 55/1026 |
| EP | 1491702 A1 | 12/2004 | |

(Continued)

OTHER PUBLICATIONS

Search Report and Written Opinion; International Patent Application No. PCT/US2022/074458; Nov. 25, 2022.

*Primary Examiner* — Joshua K Ihezie
(74) *Attorney, Agent, or Firm* — Barnes & Thornburg LLP

(57) ABSTRACT

Fire rated cleanout covers that restore and maintain a fire-rating of a constructed wall assembly. The fire rated cleanout covers are attached directly to cleanout tees to eliminate the need to secure a separate base component to a wall. Intumescent material is pre-incorporated with the fire rated cleanout covers prior to installation of the fire rated cleanout covers. As such, the intumescent material is carried with the fire rated cleanout cover when the fire rated cleanout cover is in use. The fire rated cleanout covers allow an installer to reuse the fire rated cleanout covers after maintenance or cleaning without reapplying the intumescent material to restore the fire rating of the wall.

23 Claims, 22 Drawing Sheets

(56) References Cited

U.S. PATENT DOCUMENTS

| | | | | | |
|---|---|---|---|---|---|
| 5,287,892 | A * | 2/1994 | Sanderson | F16L 55/11 138/92 |
| 5,297,691 | A * | 3/1994 | Bottcher | E04B 5/48 220/88.1 |
| 5,548,934 | A * | 8/1996 | Israelson | A62C 2/065 52/220.8 |
| 6,252,167 | B1 | 6/2001 | Rose | |
| 7,797,892 | B2 * | 9/2010 | Cannistraro | F16L 5/04 52/220.1 |
| 8,029,345 | B2 * | 10/2011 | Messmer | A62C 2/065 454/286 |
| 11,110,308 | B1 * | 9/2021 | Paulin | A62C 2/065 |
| 2008/0078841 | A1 * | 4/2008 | Messmer | F24F 7/00 236/49.3 |
| 2008/0216432 | A1 * | 9/2008 | Cannistraro | F16L 5/04 52/514 |
| 2018/0112395 | A1 * | 4/2018 | Hulteen | E04B 1/947 |
| 2020/0056073 | A1 * | 2/2020 | Hulteen | E04B 1/948 |
| 2021/0170209 | A1 * | 6/2021 | Luo | F21V 25/125 |
| 2023/0173314 | A1 * | 6/2023 | Ayres | A62C 2/065 52/232 |

FOREIGN PATENT DOCUMENTS

| | | | | |
|---|---|---|---|---|
| GB | 2488796 | A * | 9/2012 | F24F 13/068 |
| JP | 3215946 | U | 4/2018 | |
| KR | 20110043711 | A | 4/2011 | |

* cited by examiner

FIG. 5
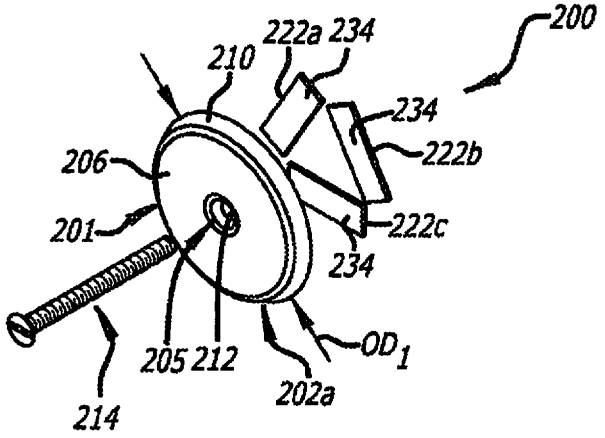
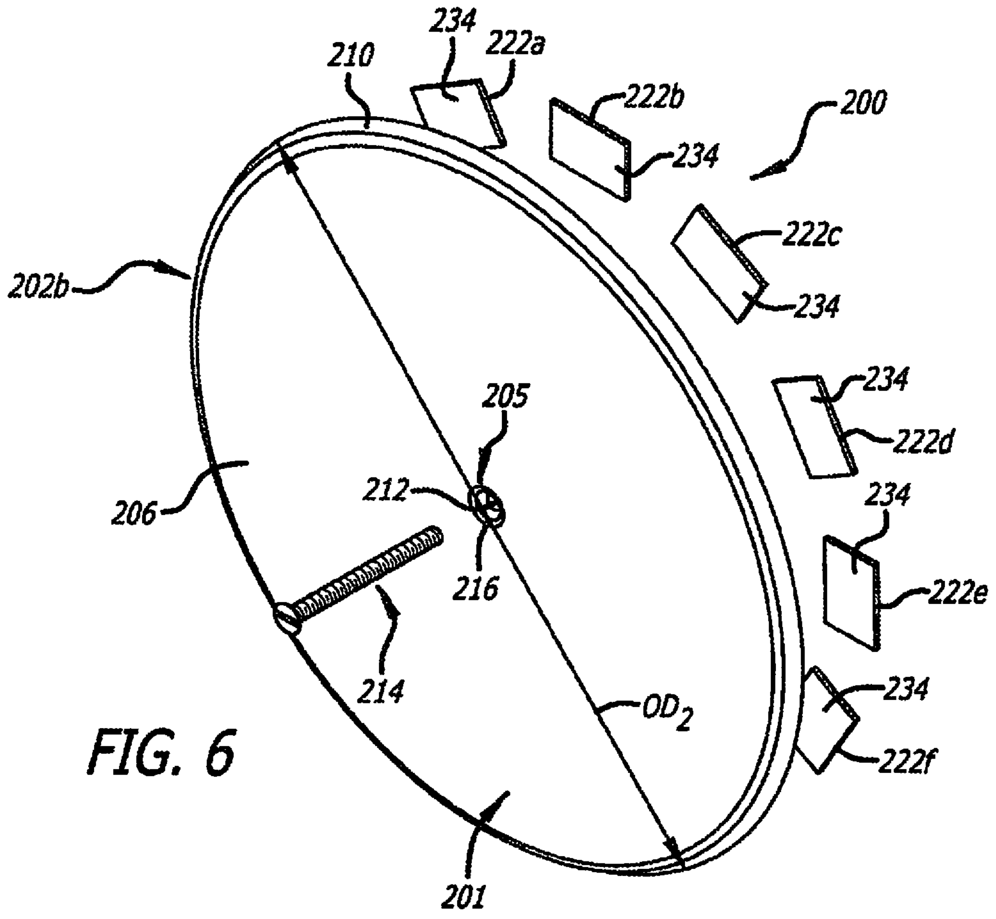
FIG. 6

FIG. 9
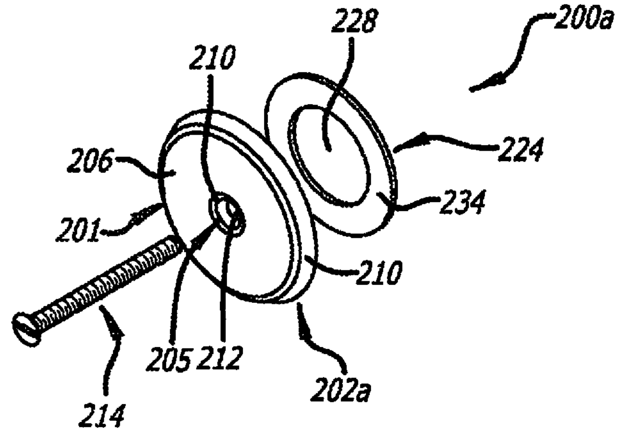
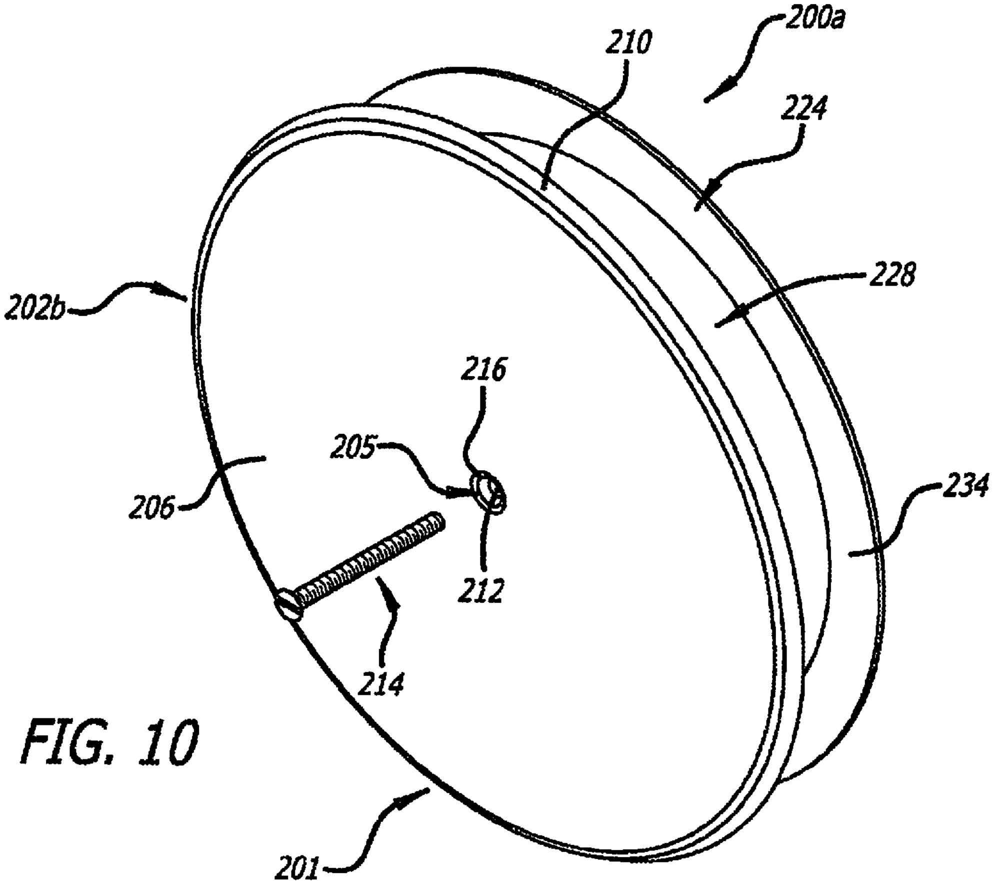
FIG. 10

FIG. 13
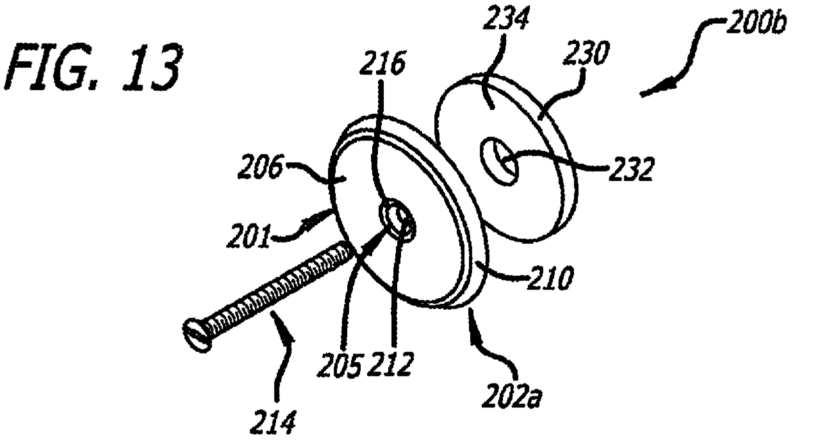
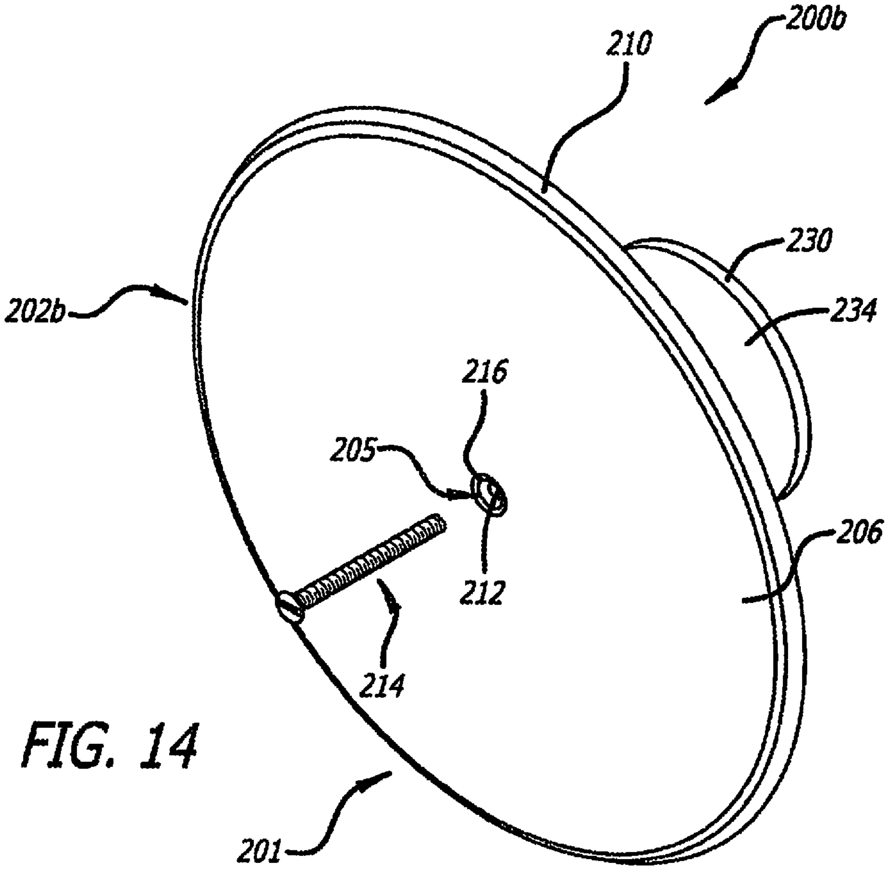
FIG. 14

FIG. 15
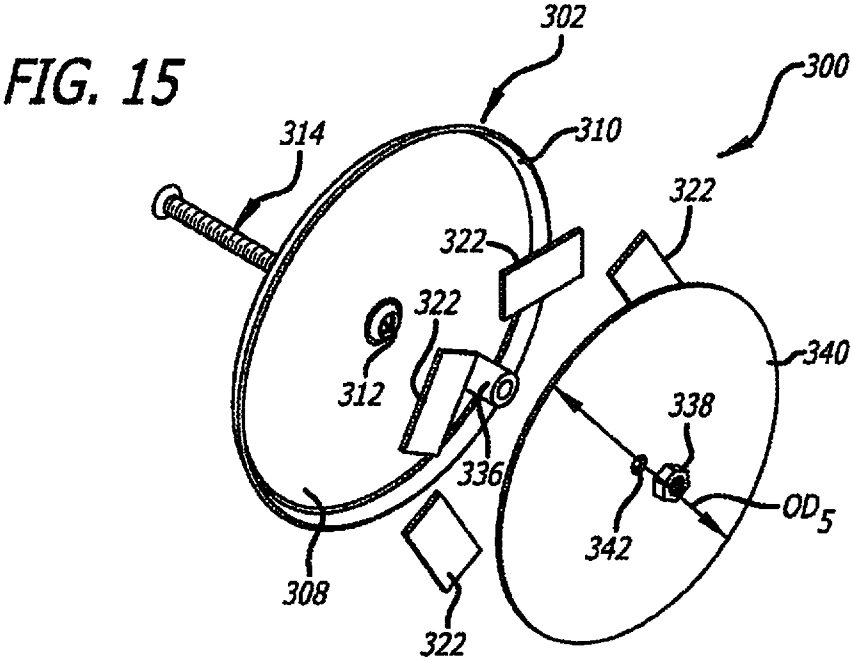
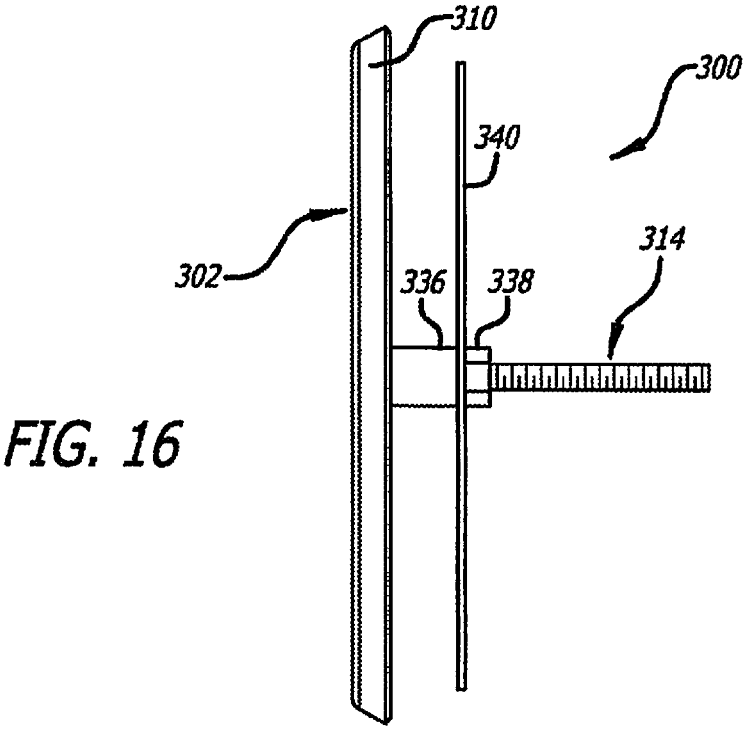
FIG. 16

FIG. 17
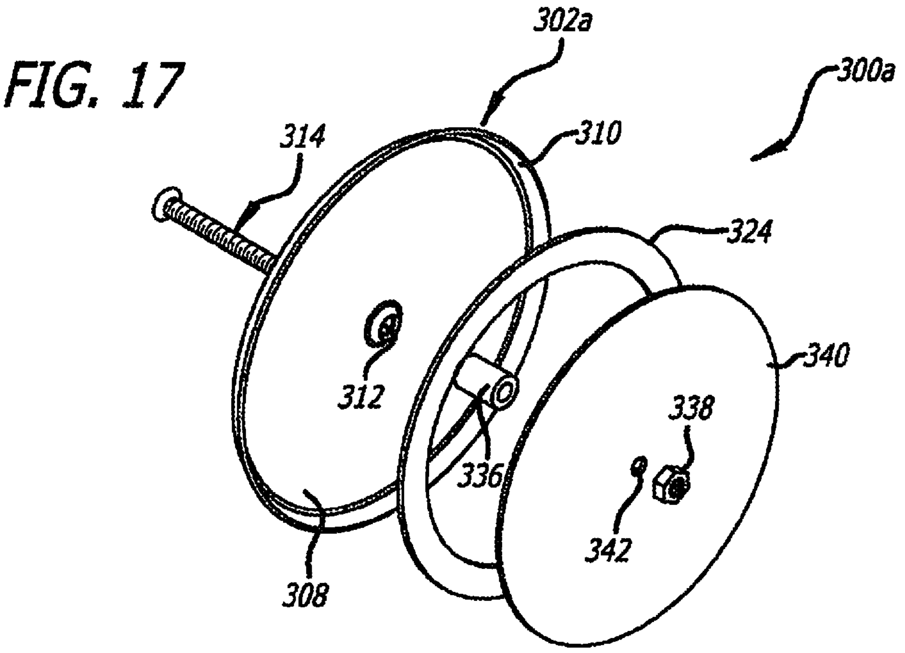
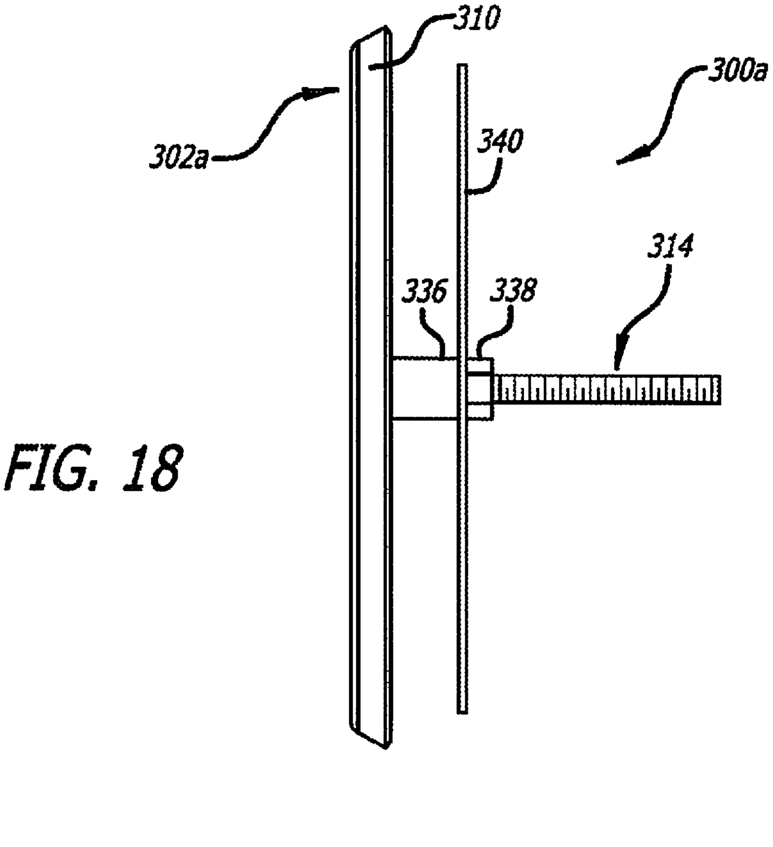
FIG. 18

FIG. 19
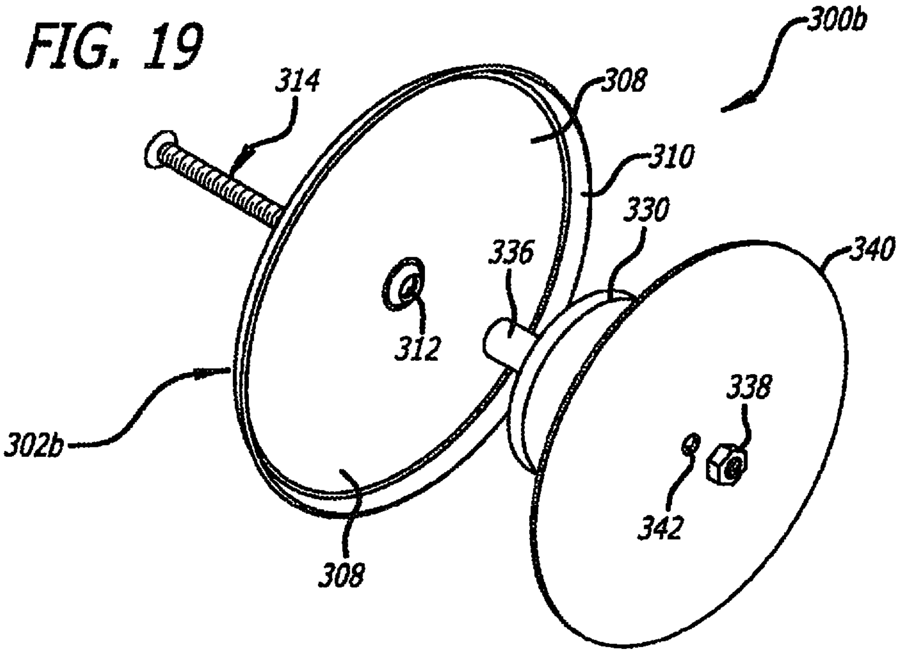
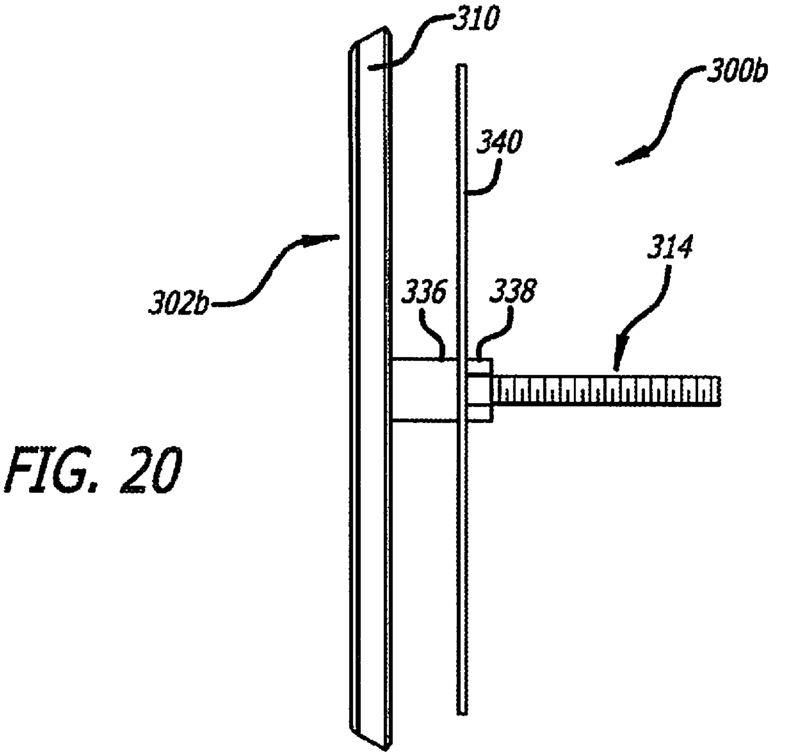
FIG. 20

FIG. 21
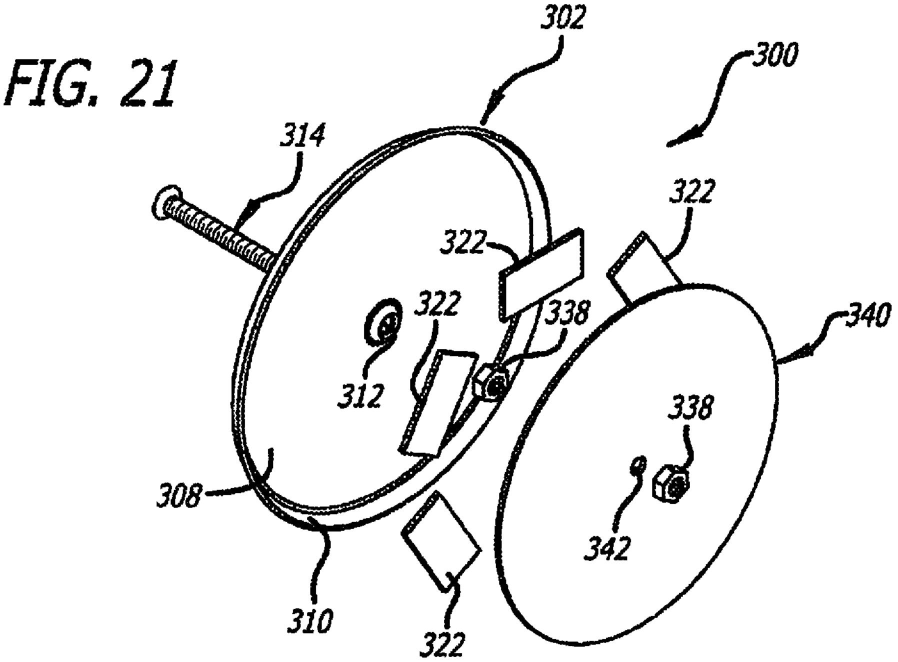
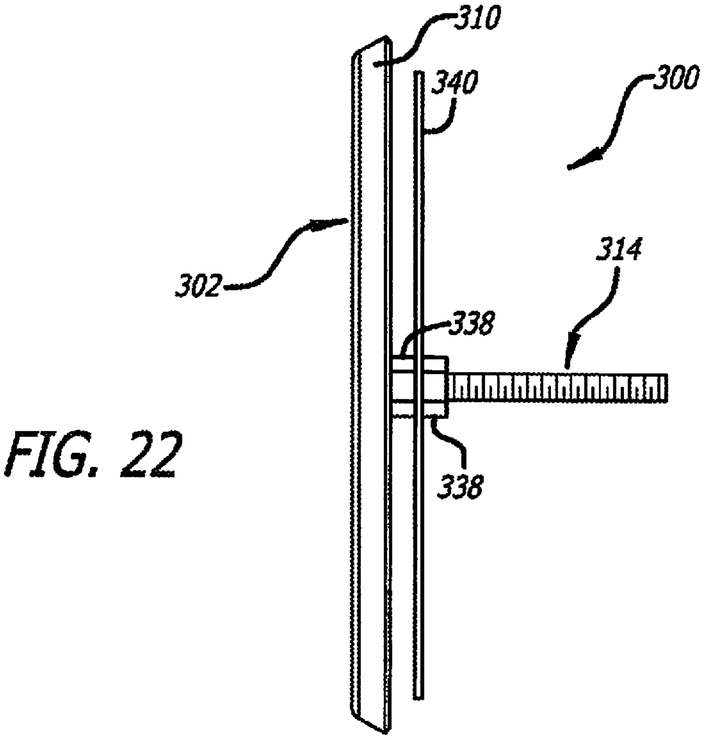
FIG. 22

FIG. 29
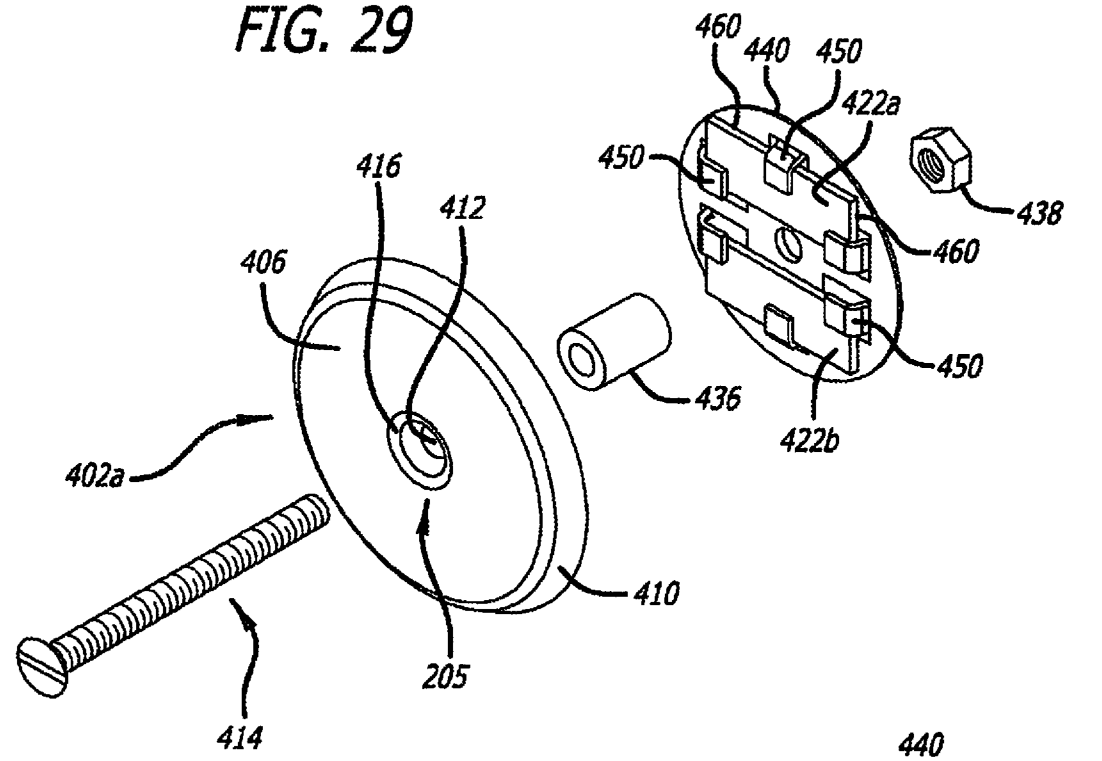
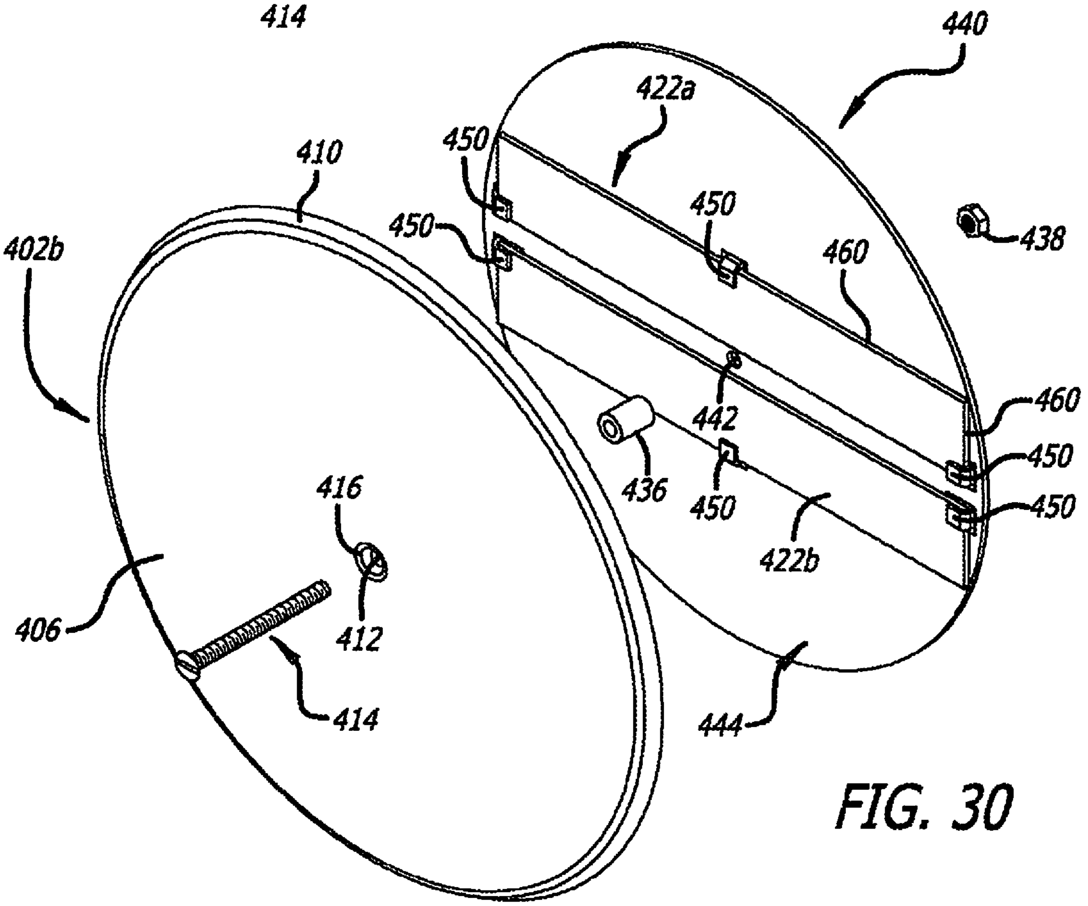
FIG. 30

FIG. 31
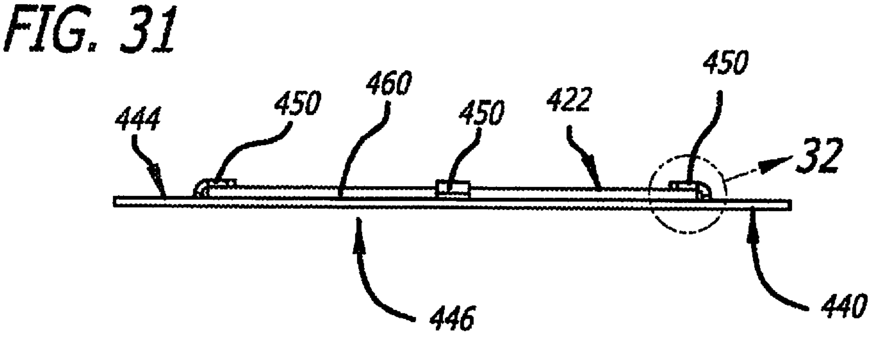
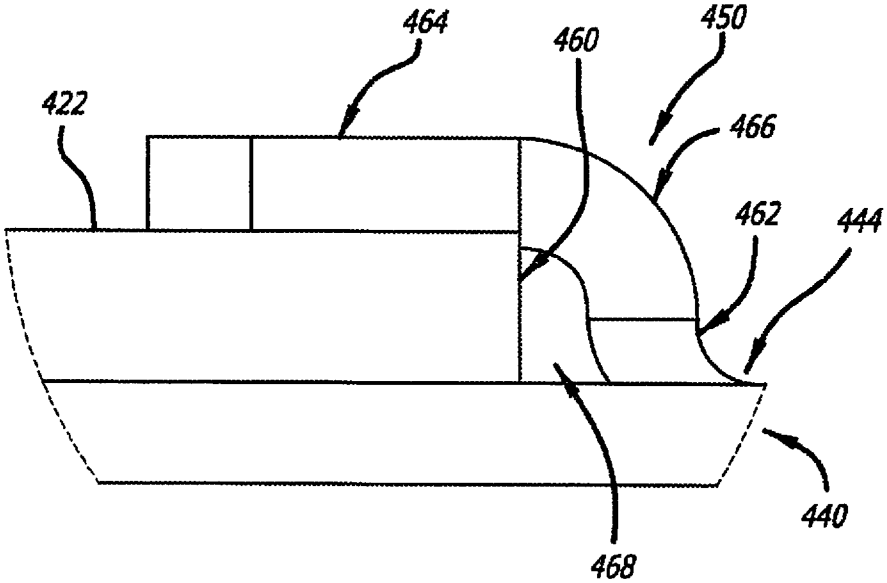
FIG. 32

FIRE RATED CLEANOUT COVER ASSEMBLIES

CROSS-REFERENCE TO RELATED APPLICATION

This application is a national phase of International Patent Application No. PCT/US2022/074458, filed Aug. 3, 2022, which claims the benefit of U.S. Provisional Application Ser. No. 63/229,314, filed Aug. 4, 2021.

INCORPORATION BY REFERENCE

International Patent Application No. PCT/US2022/074458, filed Aug. 3, 2022, and U.S. Provisional Application Ser. No. 63/229,314, filed Aug. 4, 2021, are hereby incorporated by reference as if set forth in their entireties.

TECHNICAL FIELD

The present disclosure relates generally to access covers in a plumbing system. More specifically, the present disclosure relates to fire rated cover assemblies designed to cover up access openings of a cleanout pipe in residential or commercial plumbing systems.

BACKGROUND

Residential and commercial buildings include cleanouts through which a plumber may gain access to sections of a drainpipe in a plumbing system for maintenance and cleaning. The cleanouts are generally accessible through openings in walls or floors of a building structure. Various types of covers can be used to cover the access openings in the walls or floors which are considered unsightly.

The building structure may include a fire-rated wall construction aimed at preventing fire, heat, and smoke from leaving a building or room. Fire-rated components with fire-retardant material can be used to block the path of fire, heat, and smoke for at least some period of time. The fire-retardant material may include caulk, sealant, wrap strip, or putty. Oftentimes when a cleanout is serviced in a fire-rated wall, the cover is removed thus requiring reapplication of the fire-retardant material to restore the fire rating.

Conventional cleanout cover plates generally are fastened via a fastener, such as a bolt, to a cleanout plug designed to cover a cleanout tee of a pipe. The cleanout tee may be behind a wall that has a fire-rated construction. The wall generally includes studs, insulation, and gypsum board (e.g., drywall). Insulation, however, is optional and selectively employed. The gypsum board can define an access opening (e.g., hole, cutout) for the purpose of cleaning out or testing the pipe. That is, the cleanout plug can be accessed through the access opening of the wall. The cleanout cover plate can be mounted to the wall to cover the access opening. Fire retardant intumescent material can be applied around a perimeter of the access opening prior to tightening the cleanout cover plate squarely with the wall to restore the fire-rating. The reapplication process may be messy and inefficient. In some cases, reapplication of the fire-retardant material is overlooked during routine service which leaves the access opening of the fire-rated wall void of the fire-retardant material, thus invalidating the fire rating of the wall.

Hence, there is a need for a cleanout cover assembly that can be reused after maintenance or cleaning without requiring reapplication of the fire-retardant material to restore the fire rating of a wall. The present disclosure addresses the foregoing and other related, and unrelated, issues.

SUMMARY

The present disclosure relates to fire rated or firestop cover assemblies for mounting over cleanout tees in a fire-rated wall. The fire rated cover assemblies generally are designed to comply with applicable codes and standards, such as a UL F-Rating (e.g., ASTM E814 (UL1479). The fire rated cover assemblies include an intumescent material that swells and chars when exposed to flames to create a barrier to fire, heat, and smoke. The fire rated cover assemblies can be removed for maintenance or cleaning without requiring reapplication of the intumescent material to facilitate compliance with applicable requirements, codes, and standards, such as fire rating requirements.

Aspects of the present disclosure relate to a fire rated cleanout cover assembly for covering a cleanout access opening. The fire rated cleanout cover assembly can include a cover that has a front side and a rear side. The cover can define an opening for receiving a fastener for securing the fire rated cleanout cover assembly over the cleanout access opening. The fire rated cleanout cover assembly further includes intumescent material positioned at the rear side of the cover.

Further aspects of the present disclosure relate to a fire rated cleanout cover assembly for covering a cleanout access pipe. The fire rated cleanout cover assembly can include a cover, a constraint plate, a fastener, a spacer, a nut and intumescent material. The intumescent material can be adhesively attached to the rear side of the cover such that when the cover is secured to a fire rated wall, the intumescent material can expand when heated to seal an access opening in the fire rated wall to prevent the spread of flames and smoke. The intumescent material can be positioned axially between the cover and the constraint plate such that any expansion of the intumescent material is axially constrained by the constraint plate to force the intumescent material to expand radially to seal the access opening in the fire rated wall.

Another aspect of the present disclosure relates to a fire rated cleanout cover assembly for covering a cleanout access opening. The fire rated cleanout cover assembly can include a cover that has a front side and a rear side. The cover defines an opening for receiving a fastener for securing the fire rated cleanout cover assembly over the cleanout access opening. The fire rated cleanout cover assembly also includes intumescent material pre-incorporated with the cover prior to installation of the cover over the cleanout access opening.

Another aspect of the present disclosure relates to a method for assembling a fire rated cleanout cover assembly. The method includes a step of affixing intumescent material to a cover of the fire rated cleanout cover assembly prior to installation of the fire rated cleanout cover assembly.

A further aspect of the present disclosure relates to a method for assembling a fire rated cleanout cover assembly. The fire rated cleanout cover assembly can include a cover that has intumescent material pre-incorporated with the cover and a constraint plate. The method includes the step of securing the fire rated cleanout cover assembly to a wall structure over a cleanout access opening such that the intumescent material surrounds a perimeter of the cleanout access opening. The intumescent material can be adapted to expand upon exposure to heat to seal the cleanout access opening. The method also includes a step of constraining the intumescent material between the cover and the constraint plate during expansion of the intumescent material such that the intumescent material expands radially.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 5 illustrates an exploded front perspective view of a smaller fire rated cleanout cover assembly in accordance with the principles of the present disclosure.

FIG. 6 illustrates an exploded front perspective view of a larger fire rated cleanout cover assembly in accordance with the principles of the present disclosure.

FIG. 9 illustrates an exploded front perspective view of a smaller fire rated cleanout cover assembly of FIG. 7 in accordance with the principles of the present disclosure.

FIG. 10 illustrates an exploded front perspective view of a larger fire rated cleanout cover assembly of FIG. 7 in accordance with the principles of the present disclosure.

FIG. 13 illustrates an exploded front perspective view of a smaller fire rated cleanout cover assembly of FIG. 11 in accordance with the principles of the present disclosure.

FIG. 14 illustrates an exploded front perspective view of a larger fire rated cleanout cover assembly of FIG. 11 in accordance with the principles of the present disclosure.

FIG. 15 illustrates an exploded rear perspective view of another example fire rated cleanout cover assembly in accordance with the principles of the present disclosure including intumescent strips, a constraint plate, a spacer, and a nut.

FIG. 16 illustrates an assembled side view of the fire rated cleanout cover assembly of FIG. 15.

FIG. 17 illustrates an exploded rear perspective view of the fire rated cleanout cover assembly of FIG. 15 with an intumescent ring in accordance with the principles of the present disclosure.

FIG. 18 illustrates an assembled side view of the fire rated cleanout cover assembly of FIG. 17.

FIG. 19 illustrates an exploded rear perspective view of the fire rated cleanout cover assembly of FIG. 15 with an intumescent pad in accordance with the principles of the present disclosure.

FIG. 20 illustrates an assembled side view of the fire rated cleanout cover assembly of FIG. 19.

FIG. 21 illustrates an exploded rear perspective view of another example fire rated cleanout cover assembly in accordance with the principles of the present disclosure including intumescent strips, a constraint plate, and nuts.

FIG. 22 illustrates an assembled side view of the fire rated cleanout cover assembly of FIG. 21.

FIG. 29 illustrates an exploded front perspective view of a smaller fire rated cleanout cover assembly of FIG. 23 in accordance with the principles of the present disclosure.

FIG. 30 illustrates an exploded front perspective view of a larger fire rated cleanout cover assembly of FIG. 23 in accordance with the principles of the present disclosure.

FIG. 31 illustrates a side view of the constraint palate of FIG. 28.

FIG. 32 illustrates an enlarged view of a portion of FIG. 31.

DETAILED DESCRIPTION

The present application is directed toward fire-rated cleanout covers usable with cleanout tees such as are well known in the art of plumbing. These cleanout tees may be placed within walls of residential and commercial buildings. Cleanout openings in the cleanout tees provide plumbers or maintenance workers with access to sections of a drainpipe for maintenance and cleaning. The cleanout tees are typically closed by threaded cleanout plugs or cleanout plugs held in position with spanner rings. Typically, the cleanout plugs are not always aesthetically appealing and are usually covered by cleanout covers to disguise their appearance.

Plumbers can access cleanout openings through cutouts in walls of a building that may have a fire-rated construction. As such, it is important to provide cleanout covers that can maintain or restore such fire-retardant characteristics in use.

As used herein, in this context, without more, the term "wall," can mean vertical walls, ceilings, and floors.

The present application is directed to fire rated cleanout covers that can be designed to restore and maintain a fire-rating of a wall construction. The fire rated cleanout covers can be attached directly to cleanout tee plugs to eliminate the need to secure a separate base component to a wall. Intumescent material can be pre-incorporated with the fire rated cleanout covers prior to installation of the fire rated cleanout covers. As such, the intumescent material can be carried with the fire rated cleanout cover when the fire rated cleanout cover is in use. The fire rated cleanout covers allow an installer to reuse the fire rated cleanout covers after maintenance or cleaning without reapplying the intumescent material to restore the fire rating of the wall. As such, the intumescent material is not destroyed or broken like other fire-retardant materials, i.e., caulk, when the fire rated cleanout cover is removed. The intumescent material may also be non-curable unlike a fire-retardant caulk or putty that cures upon application.

ASTM E814 "Standard Test Method for Fire Tests of Through-Penetration Fire Stops" defines a method for testing firestopping or fire rated components to ensure that they will restore a rating of a wall construction, whether the fire-rated wall assembly breach is caused by a through penetration or a membrane penetration. For purposes of exemplary illustration, it is known that a F rating of a fire rated component indicates the duration for which the fire rated component will prevent the passage of smoke and flame. While the temperature component is part of the F Rating for a floor or wall, it has been separated from the F Ratings for through penetrations. In ASTM E814 testing, T Ratings are not required. The ability of a fire rated system to prevent the temperature from rising on the un-exposed side of the assembly is recorded as the T/FT Rating.

Figure 1:
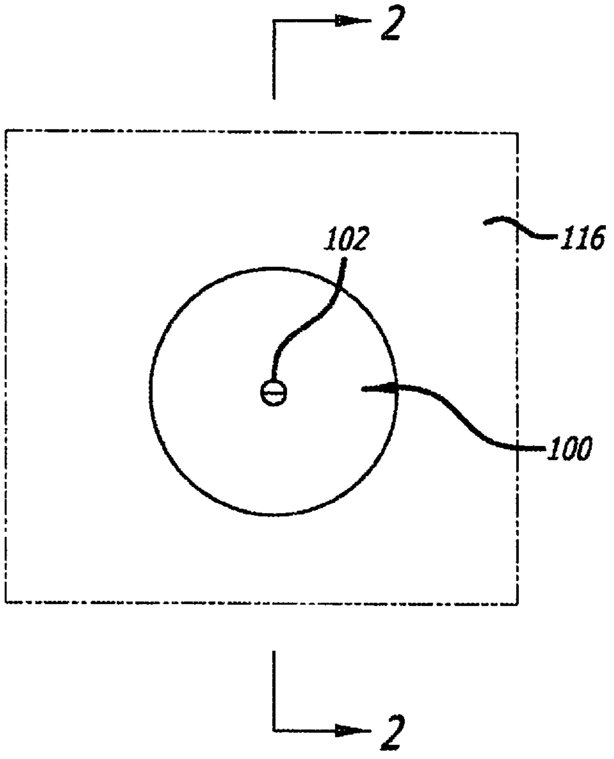
FIG. 1 illustrates a plan view of an example cover cleanout assembly mounted to a wall structure.
Figure 2:
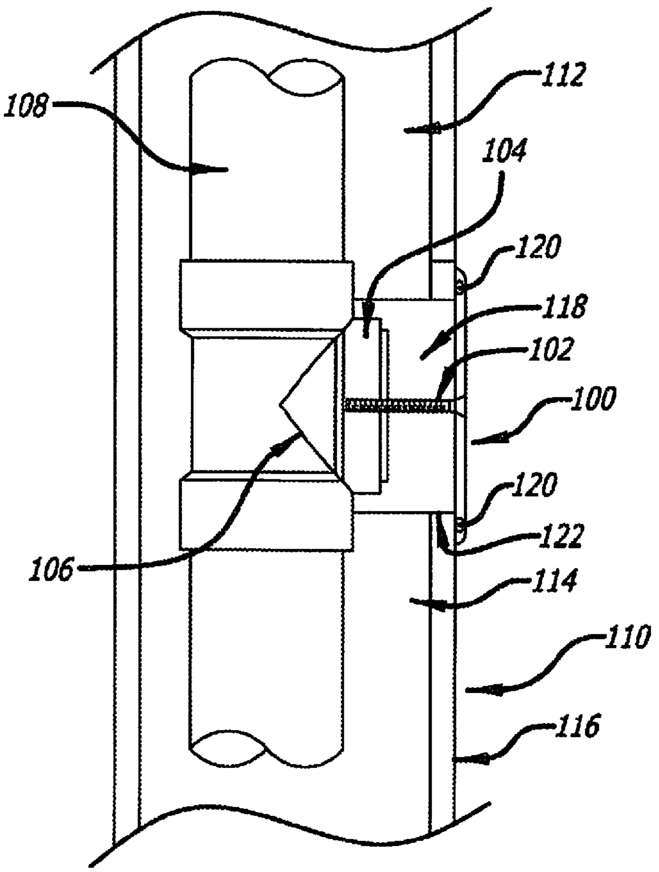
FIG. 2 illustrates a cross-sectional view taken along section line 2-2 of FIG. 1 in use.

As presented at FIGS. 1-2, a conventional cleanout cover plate 100 is shown fastened via a bolt 102 to a cleanout plug 104 designed to cover a cleanout tee 106 of a pipe 108. The cleanout tee 106 is depicted behind a wall 110 that has a fire-rated construction. The wall 110 includes studs 112, insulation 114 and gypsum board 116 (e.g., drywall). The gypsum board 116 defines an access opening 118 (e.g., hole, cutout) for the purpose of cleaning out or testing the pipe 108. That is, the cleanout plug 104 can be accessed through the access opening 118 of the wall 110. The cleanout cover plate 100 can be mounted to the wall 100 to cover the access opening 118. Fire retardant intumescent material 120 can be applied around a perimeter 122 of the access opening 118 prior to tightening the cleanout cover plate 100 squarely with the wall 110 to restore the fire-rating. As previously described, the reapplication process of the fire-retardant intumescent material may be messy, inefficient, and sometimes overlooked during routine service.

Figure 3:
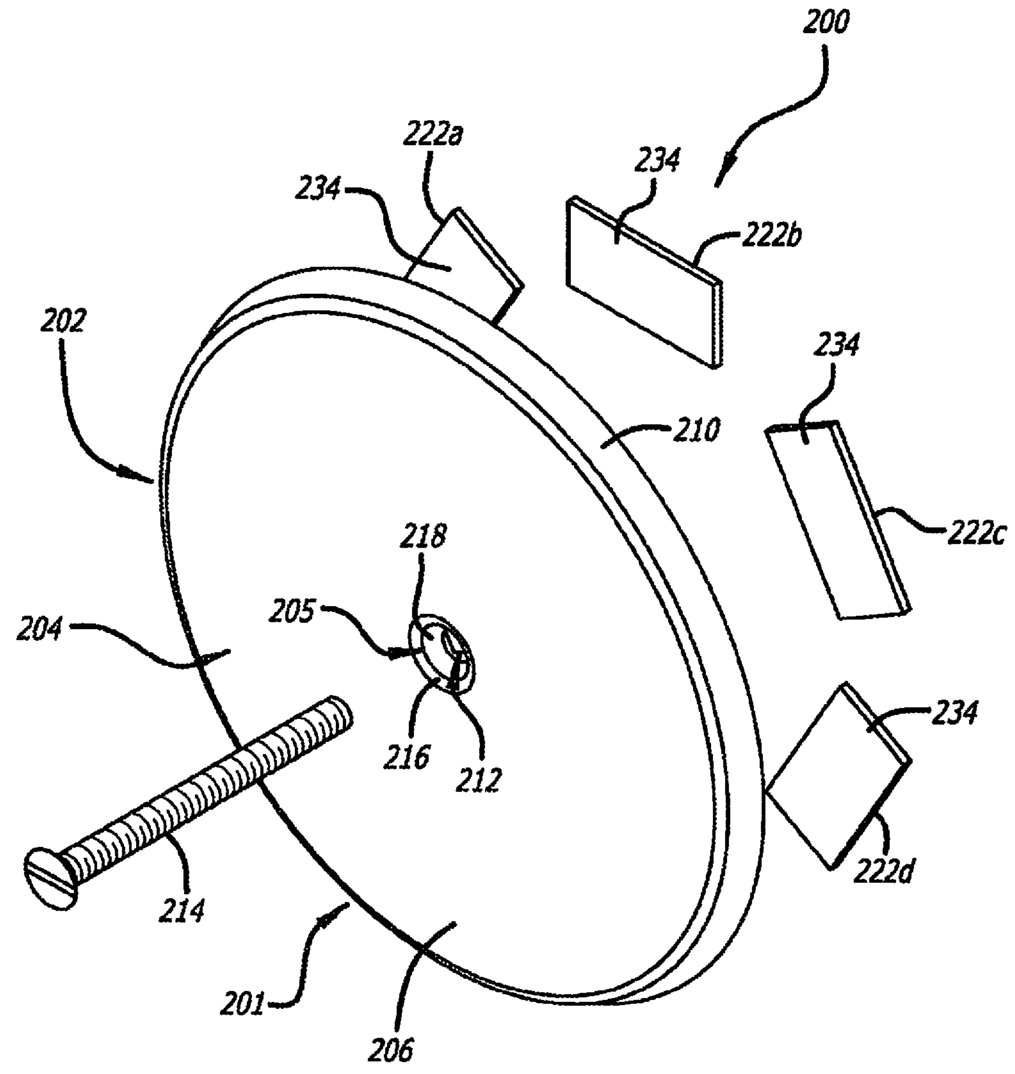
FIG. 3 illustrates an exploded front perspective view of an example fire rated cleanout cover assembly in accordance with principles of the present disclosure including a cover, a fastener and intumescent strips.
Figure 4:
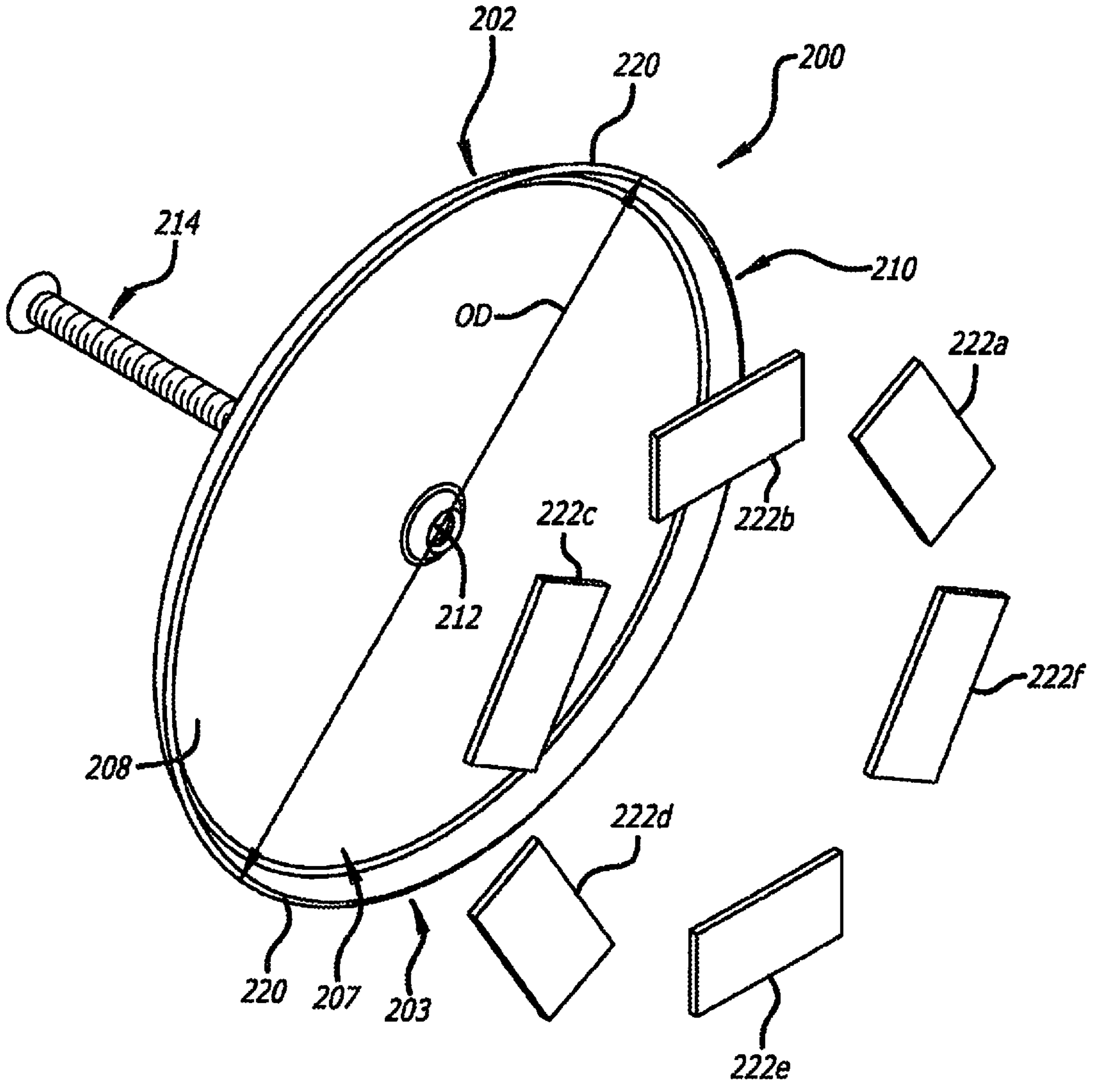
FIG. 4 illustrates an exploded rear perspective view of the fire rated cleanout cover assembly of FIG. 3.

Referring now to FIGS. 3-4, an example fire rated cleanout cover assembly 200 for covering cleanout tees 106 of pipes 108 is depicted in accordance with the principles of the present disclosure. The fire rated cleanout cover assembly 200 can be used in commercial or residential buildings.

The fire rated cleanout cover assembly 200 can include a cover 202 (e.g., cap). In certain examples, the cover 202 can have a circular or round shape with a planar region 204. It will be appreciated that the cover 202 may vary in shape or geometry.

The planar region 204 includes an outer surface 206 (e.g., a planar outer surface) at a front side 201 and an inner surface 208 (e.g., a planar inner surface) at a rear side 203. In certain examples, the cover 202 can be made from a metallic material such as, but not limited to, aluminum, iron, steel, brass, bronze, etc. or any combination of these.

The cover 202 may have an outer diameter OD designed to overlap the gypsum board a minimum of ¾ inches around the entire perimeter 122 of the access opening 118. The outer diameter OD of the cover 202 can vary in size to cover up different sized cleanout access openings. The cover 202 can range from 2 inches to 12 inches in outer diameter OD to easily cover the access opening 118. In certain examples, the cover 202 can range from about 2.5 to about 10.5 inches in outer diameter OD. In certain examples, the cover 202 can range from about 3 inches to about 11.5 inches in outer diameter OD. The cover 202 may have an outer diameter OD that ranges from less than about 4 inches to about 8 inches, although alternatives are possible. The cover 202 may have an outer diameter OD that ranges from about 3 inches to about 10 inches. In certain examples, a cover **202*a* (see FIG. 5) may have an outer diameter OD1 between about 4 inches and 12 inches. In certain examples, a cover 202*b* (see FIG. 6**) may have an outer diameter OD2 greater than about 10 inches.

The cover 202 can also include a rearwardly angled peripheral flange 210 integrally connected to the planar region 204 and extending rearwardly and radially outwardly therefrom. The planar region 204 defines a recessed central opening 212 to permit passage of a fastener 214 (e.g., threaded bolt, screw) for securing the cover 202 to a cleanout plug of a cleanout tee as depicted in FIG. 2. For example, the fastener 214 can be adapted to threadedly engage a tapped hole in the center of the cleanout plug 104. The fastener 214 may include a head with features adapted to be engaged by the interface end of a torque driver (e.g., a slotted screwdriver, a Phillips head screw driver, an Allen wrench, and/or similar tools) to facilitate turning of the fastener 214 as it extends through the access opening 118 to the cleanout plug 104.

The recessed central opening 212 is tapered and includes a chamfered surface 216 at the outer surface 206 of the cover 202. The chamfered surface 216 can be formed by chamfering an edge portion 205 from an interior surface 218 of the recessed central opening 212 to the outer surface 206 of the cover 202. The recessed central opening 212 can receive the fastener 214 which can be tightened until a peripheral edge 220 of the rearwardly angled peripheral flange 210 becomes flush against a wall surface.

The cover 202 may include intumescent material 222 (e.g., a fire-retardant material) positioned at the planar inner surface 208 of the cover 202 within a recessed region 207 at the rear side 203 of the cover 202. The intumescent material 222 can be radially inwardly offset from the rearwardly angled peripheral flange 210 of the cover 202. As such, the intumescent material 222 may not be positioned along the peripheral edge 220 of the cover 202.

In certain examples, the intumescent material 222 can be adhesively adhered to the planar inner surface 208 of the cover 202. The intumescent material 222 can be secured (e.g., pre-adhered, pre-attached) as part of the cover 202 prior to installation of the cover 202. That is, the intumescent material 222 can be pre-incorporated (e.g., secured, attached, carried) with the cover 202. The intumescent material 222 can be radially inwardly offset from the chamfered portion of the cover 202, although alternatives are possible. In other examples, the intumescent material 222 may be attached to a constraint plate in examples where a constraint plate is provided.

The cover 202 is adapted to be mounted to a fire rated wall structure to cover up an access opening in the fire rated wall structure. When the cover 202 is mounted, the intumescent material 222 is spaced to surround a perimeter of the access opening to prevent fire and smoke from getting into the access opening and spreading. In this manner, the intumescent material 222 can be disposed proximate the access opening formed in the fire rated wall structure. The intumescent material 222 may be spaced on the cover 202 to ensure a complete seal. In certain examples upon installation of the cover 202, the intumescent material 222 may not be compressed axially between the perimeter of the cover 202 and the wall structure.

The purpose of having the intumescent material 222 adhered to the inner surface 208 of the cover 202 is to create fire protection areas. When the intumescent material 222 becomes hot, it will expand rapidly into the open areas around it, i.e., the access opening 118. That is, when the temperature rises near a wall surface, the intumescent material 222 will heat up and char when exposed to flames. When the intumescent material 222 becomes hot enough, it will quickly expand to multiple times its original volume. This expansion will help to create a barrier, or seal, substantially preventing fire, heat, and smoke from moving from one area of a building to another for at least some period of time.

In certain examples, the intumescent material 222 of the fire rated cleanout cover assembly 200 can have a pre-shaped structure such as intumescent strips 222*x*, although alternatives are possible. The plurality of intumescent strips 222*x* can be spaced apart in a circumference or any number of arrangements on the inner surface 208 of the cover 202.

The number of intumescent strips 222*x* adhered to the cover 202 may vary with the different outer diameter OD sizes of the cover 202. A cover with a large diameter may include more intumescent strips compared to a cover with a small diameter. For example, the cover 202*a* shown in FIG. 5 may have two or more intumescent strips 222*x*. The cover 202*a* may include at least three intumescent strips 222*a-c*. The cover 202*b* shown in FIG. 6 may have at least six intumescent strips 222*a-f*, although alternatives are possible. Furthermore, it will be appreciated that the intumescent strips 222*x* may be cut-to-length based on varying diameters of the cover 202. That is, each intumescent strip 222*x* can be cut at a desired length and width to correspond with the cover's diameter.

Figure 7:
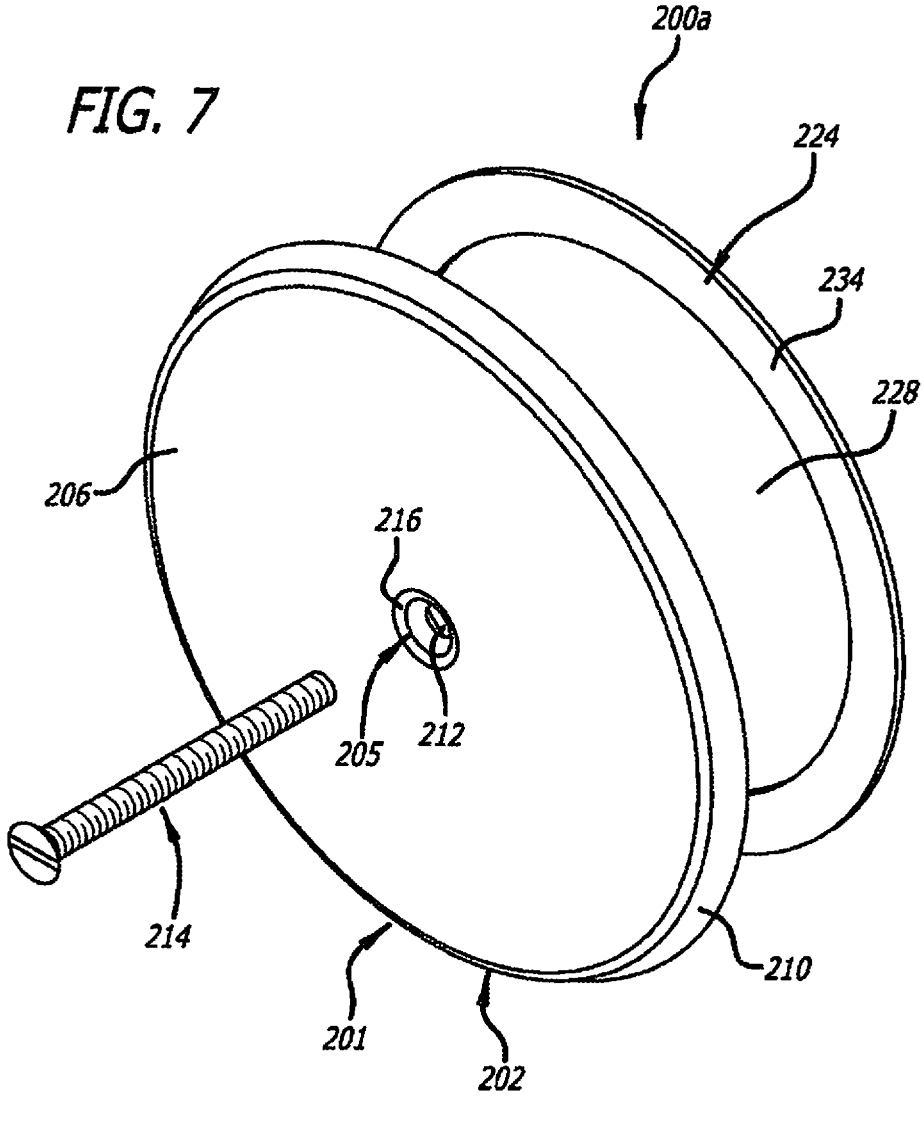
FIG. 7 illustrates an exploded front perspective view of the fire rated cleanout cover assembly of FIG. 3 with a continuous intumescent ring.
Figure 8:
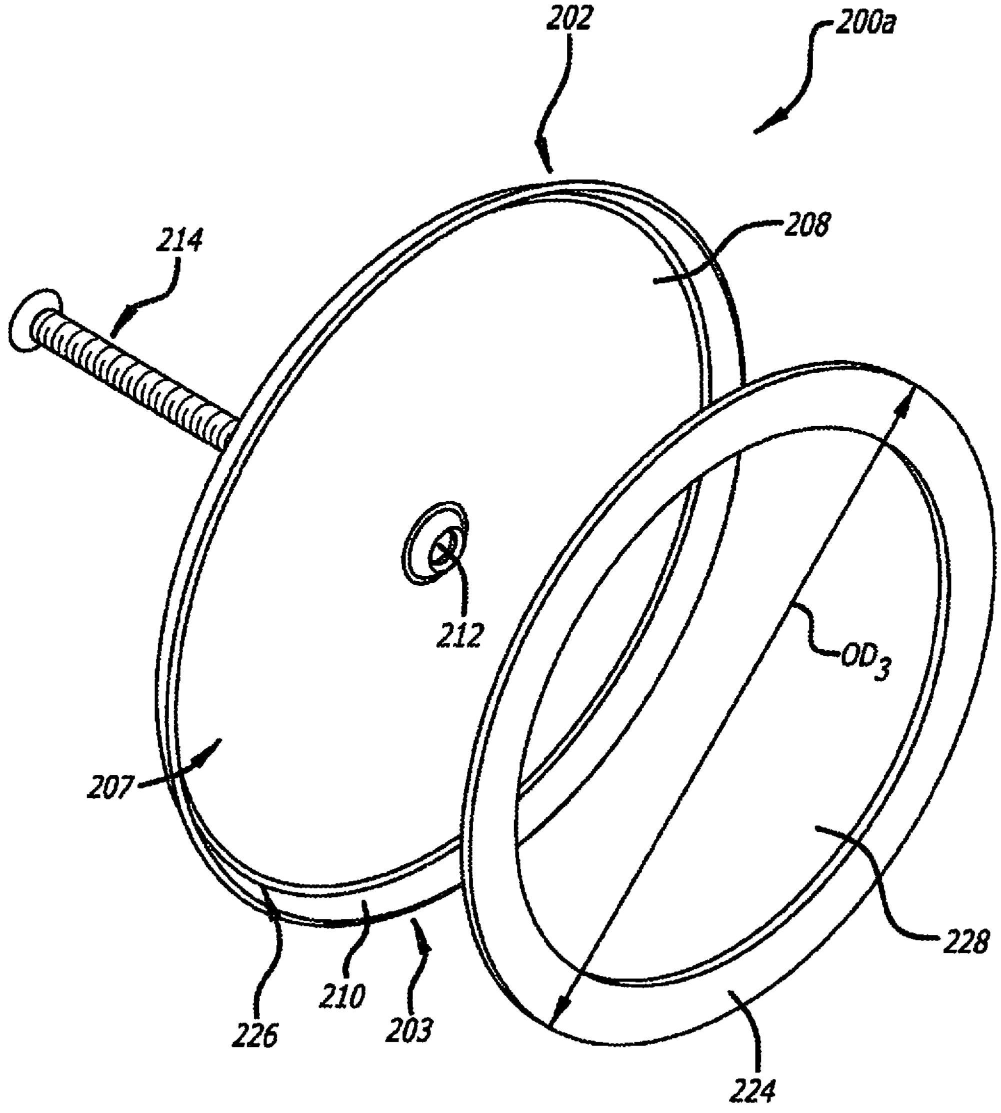
FIG. 8 illustrates an exploded rear perspective view of the fire rated cleanout cover assembly of FIG. 7.

In certain examples, the intumescent material 222 can have a uniform construction. That is, the intumescent material 222 can have a pre-shaped structure in the form of a continuous intumescent ring 224 pre-incorporated as part of the cover 202 shown in FIGS. 7-8 of an alternate fire rated cleanout cover assembly 200*a*. The continuous intumescent ring 224 can be adhesively attached to the inner surface 208 of any of the covers 202, 202*a*, 202*b* (see FIGS. 9-10) described above. The continuous intumescent ring 224 can have an outer diameter OD3 that is smaller in size compared to the outer diameter of the cover 202 and is positioned uninterrupted on the inner surface 208 around an inside perimeter 226 of the cover 202. The continuous intumescent ring 224 defines an opening 228 that allows the fastener 214 to pass therethrough.

Figure 11:
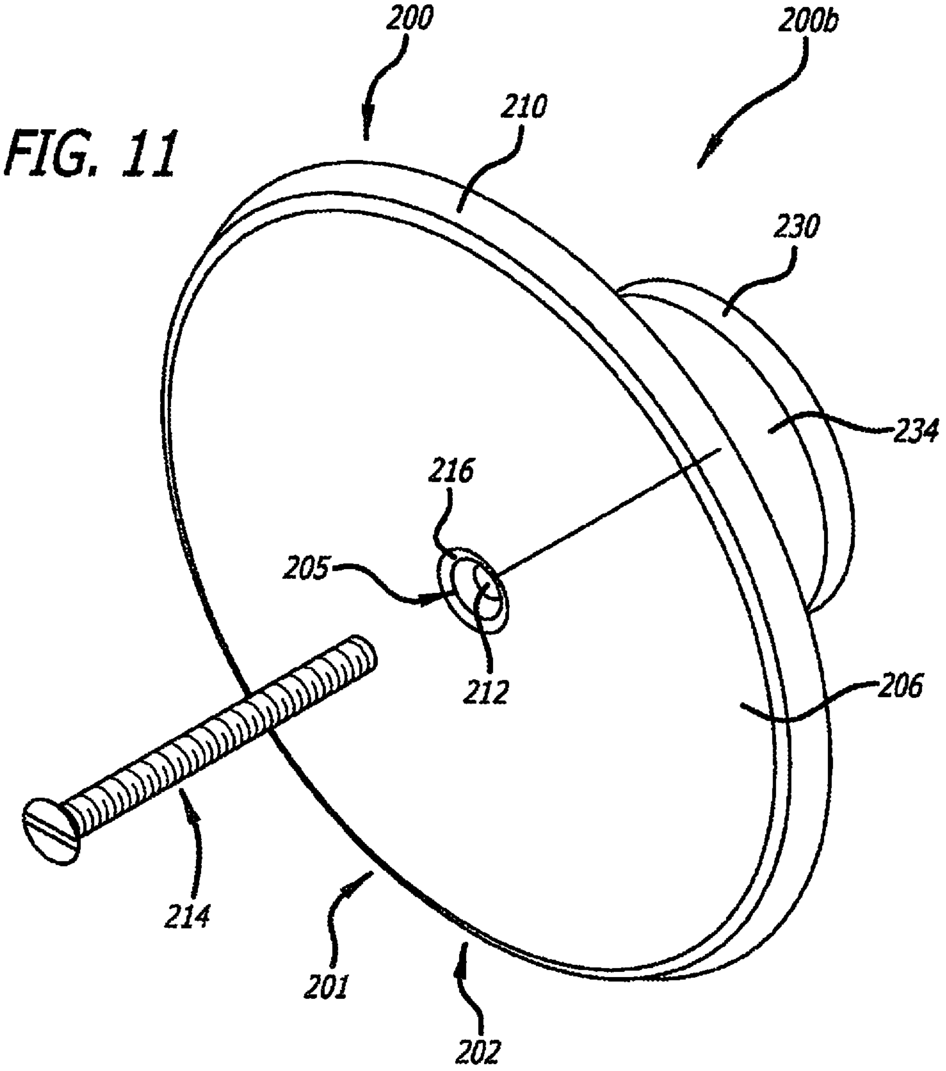
FIG. 11 illustrates an exploded front perspective view of the fire rated cleanout cover assembly of FIG. 3 with an intumescent pad.
Figure 12:
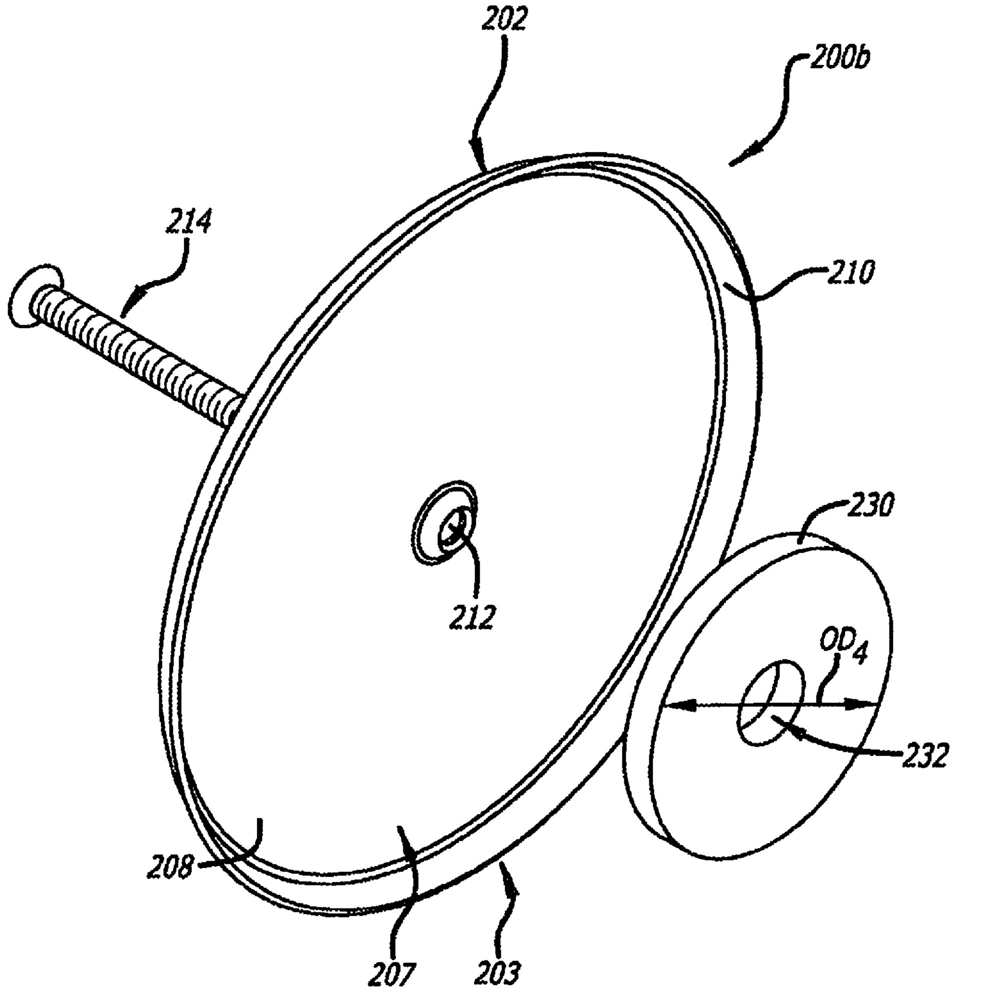
FIG. 12 illustrates an exploded rear perspective view of the fire rated cleanout cover assembly of FIG. 11.

In certain examples, the intumescent material 222 can also have a pre-shaped structure such as an intumescent pad 230 pre-incorporated as part of the cover 202 shown in FIGS. 11-12 to provide another fire rated cleanout cover assembly 200*b*. The intumescent pad 230 can also be adhesively attached to the inner surface 208 of any of the covers 202, 202*a*, 202*b* (see FIGS. 13-14) described above. The intumescent pad 230 can be thicker than the strips or ring of intumescent material 222. The intumescent pad 230 can have an outer diameter OD4 that is smaller in size compared to the continuous intumescent ring 224 or the outer diameter OD of the cover 202. The intumescent pad 230 defines an opening 232 that allows the fastener 214 to pass therethrough when the intumescent pad 230 is adhered to the inner surface 208 of the cover 202.

The intumescent strips 222*x*, continuous intumescent ring 224, and the intumescent pad 230 can include a protective liner 234 that is removable to expose an adhesive backing which permits the intumescent material 222 to be secured to the inner surface 208 of the cover 202. The protective liner 234 can be made from a film material formed from polyethylene or the like.

The advantageous feature of the cover 202 and intumescent material 222 that is adhered thereto is the overall solution provided to customers that need to meet a particular fire rating, such as 1-hour to 2-hour fire rating wall assembles or other fire ratings to fire related wall assemblies in accordance with applicable requirements, codes, and standards. The intumescent material can be pre-applied to the cover 202 (e.g., in the manufacturing facility) and carried with the cover 202 during installation and during removal of the cover 202 for maintenance access of a clean-out plug. As such, the intumescent material 222 can be removeable with the cover 202 from a wall structure without the intumescent material 222 being damaged. That is, after breach of a fire rated assembly due to maintenance or cleaning, the fire rated cleanout cover assemblies 200, 200*a*, 200*b* may be applied to restore such systems. The intumescent material 222 can also be removeable with the cover 202 without compromising the fire rating of the cover 202 upon re-installation of the cover 202 or requiring re-application of the intumescent material 222. That is, because the intumescent material 222 does not bond to a wall structure as part of the installation process, an installer may reuse the fire rated cleanout cover assemblies 200, 200*a*, 200*b* without requiring reapplication of the intumescent material 222 to restore a wall fire rating. This is unlike conventional systems that require reapplication of intumescent caulk, sealant or putty to restore the fire rating, which can be messy, inefficient, and oftentimes overlooked during routine service, thus leaving the opening within the fire-rated wall assembly void of fire rated material.

Turning to FIGS. 15-16, another example fire rated cleanout cover assembly 300 is depicted in accordance with the principles of the present disclosure. The fire rated cleanout cover assembly 300 has similar features as the fire rated cleanout cover assembly 200 previously described except that the fire rated cleanout cover assembly 300 also includes a spacer 336, a nut 338, and a constraint plate 340 (e.g., rear plate, backing plate). As such, the like reference numbers will be used to designate common parts.

Intumescent material 322 can be adhered to an inner surface 308 of a cover 302 of the fire rated cleanout cover assembly 300 similar to the fire rated cleanout cover assembly 200. The intumescent material 322 can be positioned axially between a rear side of the cover 302 and a front of the constraint plate 340.

The constraint plate 340 may be a galvanized steel plate. The constraint plate 340 can have a circular shape and an outer diameter OD4 that is smaller than the outer diameter OD of the cover 302 which is similar to the cover 202, although alternatives are possible. The outer diameter OD4 of the constraint plate 340 can be sized to be received within an access opening of a wall structure. As such, the outer diameter OD4 of the constraint plate 340 can be smaller than a diameter of the access opening. The outer diameter OD4 of the constraint plate 340 can vary in size to correspond with varying diameters of the access opening and the cover 302. The constraint plate 340 may have an outer diameter OD5 that ranges from about 2 inches to about 12 inches, although alternatives are possible. In certain examples, the constraint plate 340 may have an outer diameter OD5 that is two, three, four, five, six, eight, ten or twelve inches.

The constraint plate 340 has a central opening 342 to permit passage of a fastener 314. The fastener 314 can be threaded to receive a similarly threaded plug used to close a cleanout tee similar to FIG. 2. The fastener 214 can be used to attach the cover 302 directly to the cleanout tee plug and thus eliminate the need to secure a separate base component to a wall. The fastener 314 pulls the cover 302 to the wall by pressure and allows the constraint plate 340 to abut an exterior wall surface.

In other examples, the constraint plate 340 and the cover 302 may be mechanically sandwiched between a plate and the gypsum board or sheet rock. As such, in the event that the cleanout tee melts or falls out, the fire rated cleanout cover assembly 300 can remain attached to the wall structure to maintain the fire rating.

The fire rated cleanout cover assembly 300 includes constraint plate adjustment members such as the nut 338 and/or the spacer 336 that can be threaded on the fastener 314 in front and in back of the constraint plate 340 for adjusting an axial position of the constraint plate 340 on the fastener 314 relative to the cover 302.

In certain examples, the nut 338 can be adapted to secure the constraint plate 340 and the spacer 336 to the rear side of the cover 302. In certain examples, the spacer 336 can be internally threaded to actuate along the fastener 314 to drive and position the constraint plate 340 relative to a wall. In certain examples, the wall may have a minimum thickness of about ⅝ inches. The spacer 336 can be used for spacing the constraint plate 340 axially from the cover 302. In certain examples, the spacer 336 may be internally threaded.

In certain examples, the spacer 336 may be replaced with another threaded nut 338 (see FIGS. 21 and 22) that would allow an installer to have more flexibility for adjusting the constraint plate 340 back and forth along the fastener 314. Thus, the nut 338 can be actuated to engage the fastener 314 for driving the constraint plate 340 axially to be positioned at a desired width relative to the cover 302.

In certain examples, the threaded nut 338 can drive the constraint plate 340 behind either a single or a double layer of sheet rock. If there is tile or other wall finishing materials on the wall, the threaded nut 338 can be adjusted to drive the constraint plate 340 back even further behind the wall while capturing the intumescent material 322 at the desired depth within the membrane penetration of the wall. The constraint plate 340 can be sized and configured to prevent intumescent material 322 from expanding into a wall cavity when the intumescent material 322 is exposed to heat. When the intumescent material 322 is heated by flames and becomes hot enough to expand to multiple times its original volume, the intumescent material 322 can be positioned axially between the cover 302 and the constraint plate 340. Expansion of the intumescent material 322 can be axially constrained by the constraint plate 340 which forces the intumescent material 322 to expand radially to better fill/seal the access opening, or membrane penetration, in the wall.

One of the advantageous features of the constraint plate 340 is reducing the probability of the intumescent material 322 expanding into a wall cavity or other orifice and falling out of position when the intumescent material 322 is exposed to heat. An installer can remove the cover 302 without damaging the intumescent material 322 like caulk would be damaged. Rather, the intumescent material 322 can be carried with and protected by the cover 302 such that the intumescent material 322 does not bond to a wall upon installation. As such, the cover 302 of the fire rated cleanout cover assembly 300 can be used to replace an existing cover without requiring reapplication of the intumescent material 322 to restore the fire rating and the fire rated cleanout cover assembly 300 can be used for new installations.

Typically, insulation may be packed within a wall structure to help hold intumescent material in place within the wall cavity. The fire rated cleanout cover assembly 300 can be a better configuration in that the constraint plate 340 provides such constraint without the need for insulation. Thus, another advantageous feature of the fire rated cleanout cover assembly 300 is that it may be used in residential or commercial buildings that may have either a single or a double layer of gypsum board and/or no insulation. The constraint plate 340 keeps the intumescent material 322 trapped within the thickness of the gypsum boards of the wall. As such, the intumescent material 322 can be prevented from falling inside the wall cavity without the need to have any other treatment within the wall, such as the insulation shown in FIG. 2.

The fire rated cleanout cover assemblies 220, 200*a*, 200*b*, 300, 300*a*, 300*b* according to the present disclosure are designed to meet applicable requirements, codes, and standards, such as (by way of example) fire rating standards per ASTM E814, UL 1474 or similar accepted industry fire rated standards.

Although the intumescent material 322 is shown as a plurality of intumescent strips 222*x* (see FIG. 15), it will be appreciated that similar to the fire rated cleanout cover assemblies 200*a*, 200*b* above, the intumescent material 322 can also be a continuous intumescent ring 324 (see FIG. 17) as depicted in fire rated cleanout cover assembly 300*a*, or an intumescent pad 330 (see FIG. 19) as depicted in fire rated cleanout cover assembly 300*b*.

Figure 33:
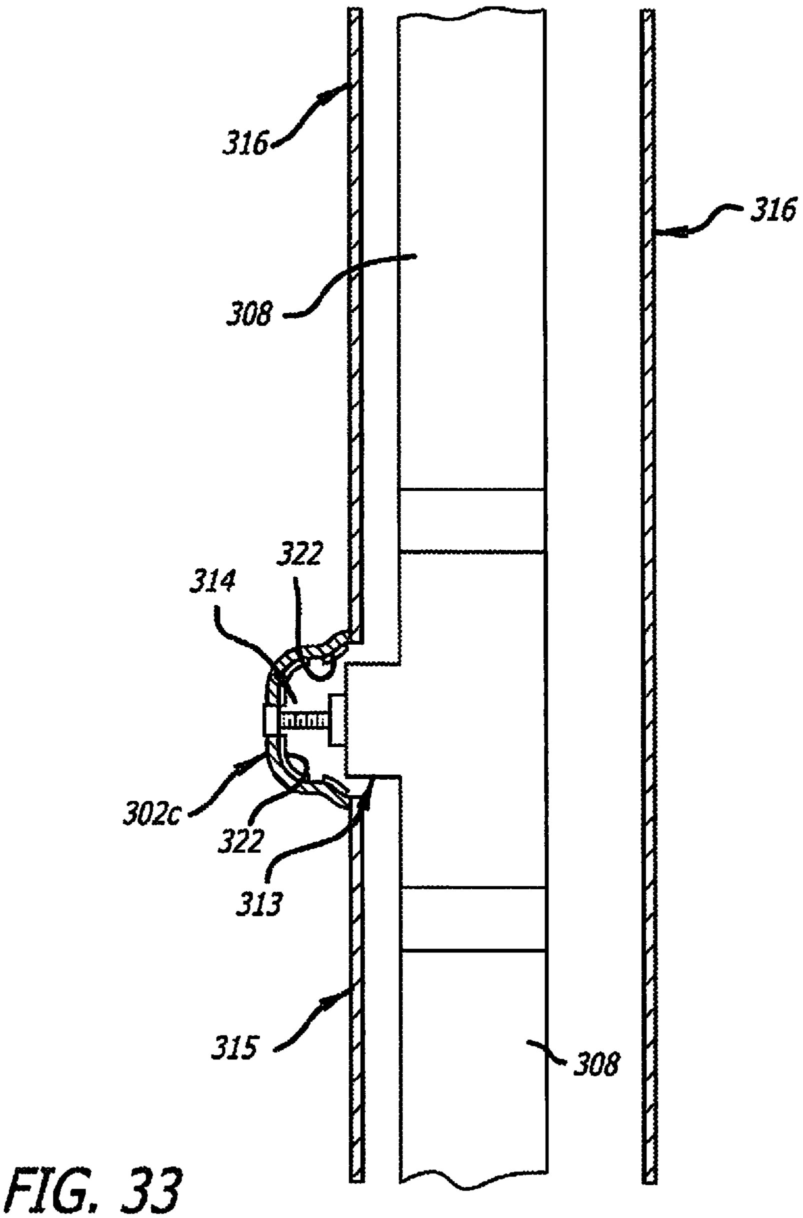
FIG. 33 illustrates another example fire rated cleanout cover assembly showing a dome shaped cover.

In certain examples, the fire rated cleanout cover assembly may have a dome shaped cover 302*c* as shown in FIG. 33. The dome shaped cover 302*c* can be used when a cleanout plug 313 for a cleanout tee 315 of a pipe 308 protrudes beyond a surface 315 of a gypsum board 316. The intumescent material 322 can be positioned at various locations inside the cover 302*c*.

As described above, firestop material can be pre-attached to the inside surface of the cleanout cover in sections, a ring, a pad, a donut, or other configuration.

Figure 23:
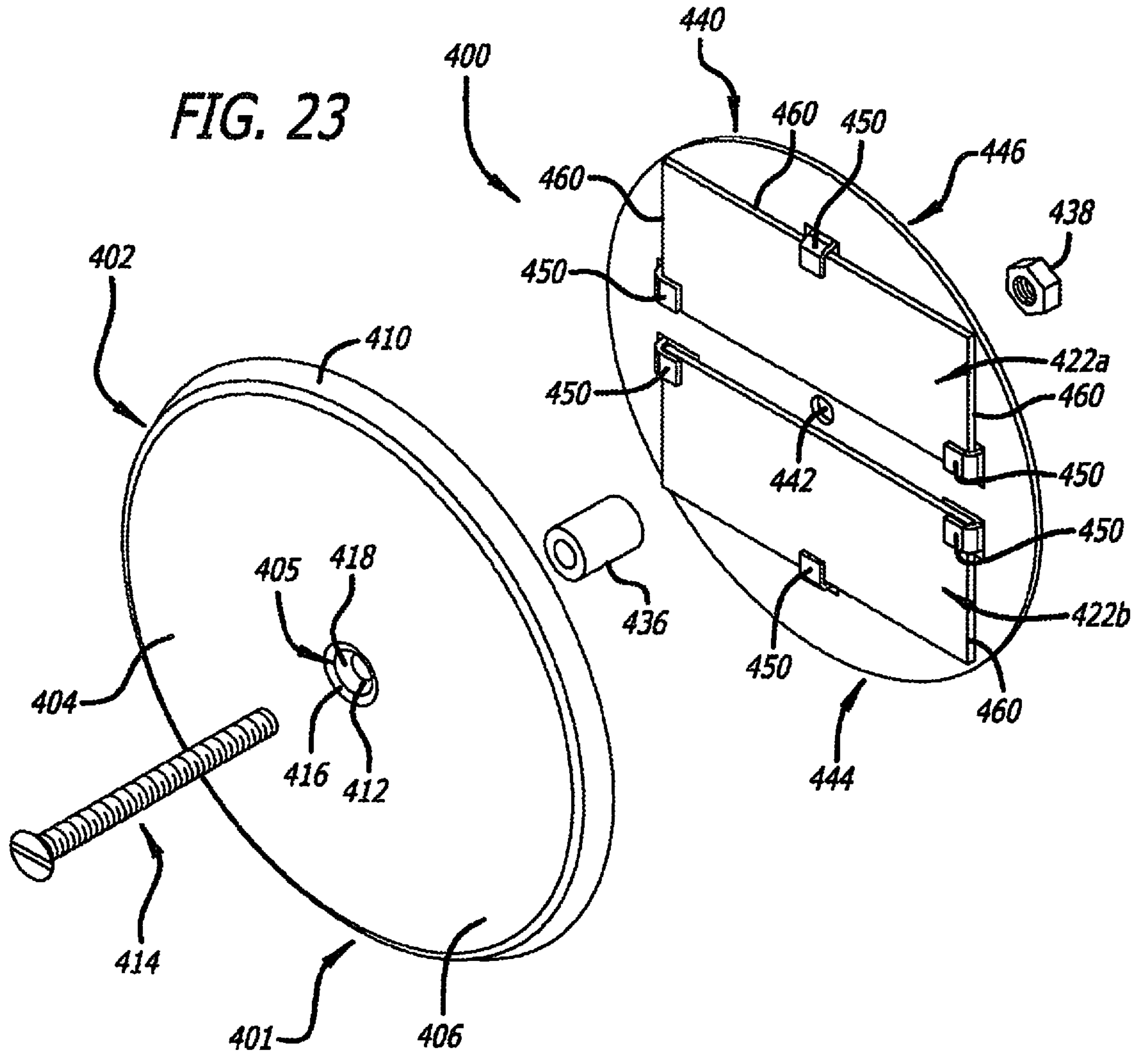
FIG. 23 illustrates an exploded front perspective view of another example fire rated cleanout cover assembly including retention fingers at a front side of another example constraint plate securing the intumescent strips thereon in accordance with the principles of the present disclosure.
Figure 24:
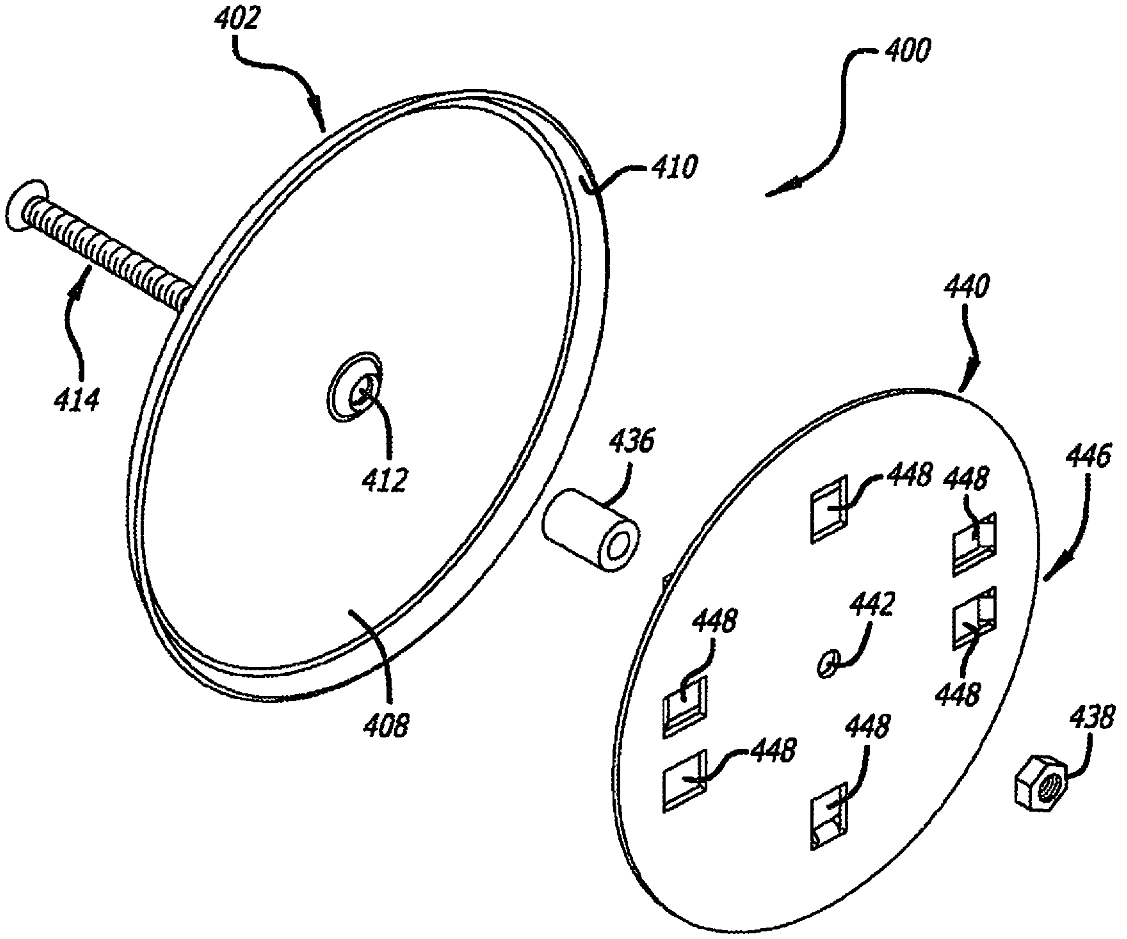
FIG. 24 illustrates an exploded rear perspective view of the fire rated cleanout cover assembly of FIG. 23.
Figure 25:
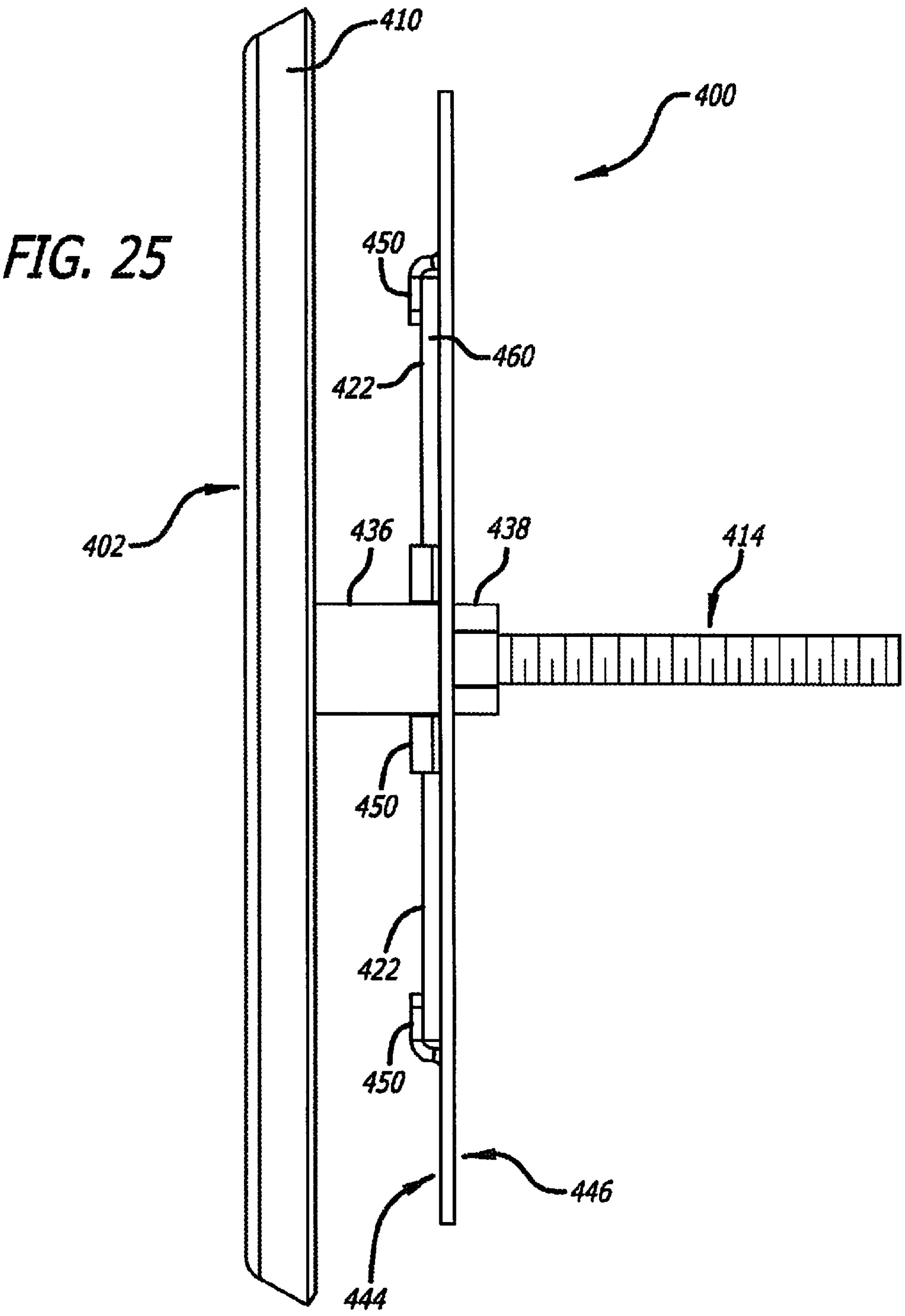
FIG. 25 illustrates an assembled side view of the fire rated cleanout cover assembly of FIG. 23.

Referring to FIGS. 23-25, another example fire rated cleanout cover assembly 400 is depicted in accordance with the principles of the present disclosure. The fire rated cleanout cover assembly 400 has similar features as the fire rated cleanout cover assembly 300 previously described except intumescent material 422 is positioned on a constraint plate 440 of the fire rated cleanout cover assembly 400. As such, the like reference numbers will be used to designate common parts.

The constraint plate 440 may include a front side 444 (e.g., a front surface) and an opposite, back side 446 (e.g., a back surface). The constraint plate 440 may define a plurality of recess openings 448 (e.g., cutouts, notches, window openings) that can be arranged in various orientations on the constraint plate 440. Each recess opening 448 can include a retention finger 450 (e.g., retaining finger) that may be stamped into the constraint plate 440 through the recess opening 448. That is, the retention fingers 450 may be stamped from the back side 446 of the constraint plate 440 to extend through the recess openings 448 to the front side 444 of the constraint plate 440.

The retention fingers 450 can be positioned in any number of different ways on the constraint plate 440 to mount the intumescent material 422 to the constraint plate 440. That is, the intumescent material 422 may be secured to the front side 444 of the constraint plate 440. The constraint plate 440 can be positioned within a wall cavity using a spacer 436 and a nut 438 similar to the constraint plate 340 described above. The intumescent material 422 may include intumescent strips 422*x* that can be held by the retention fingers 450 at the front side 444 of the constraint plate 440 of the fire rated cleanout cover assembly 400.

Figure 26:
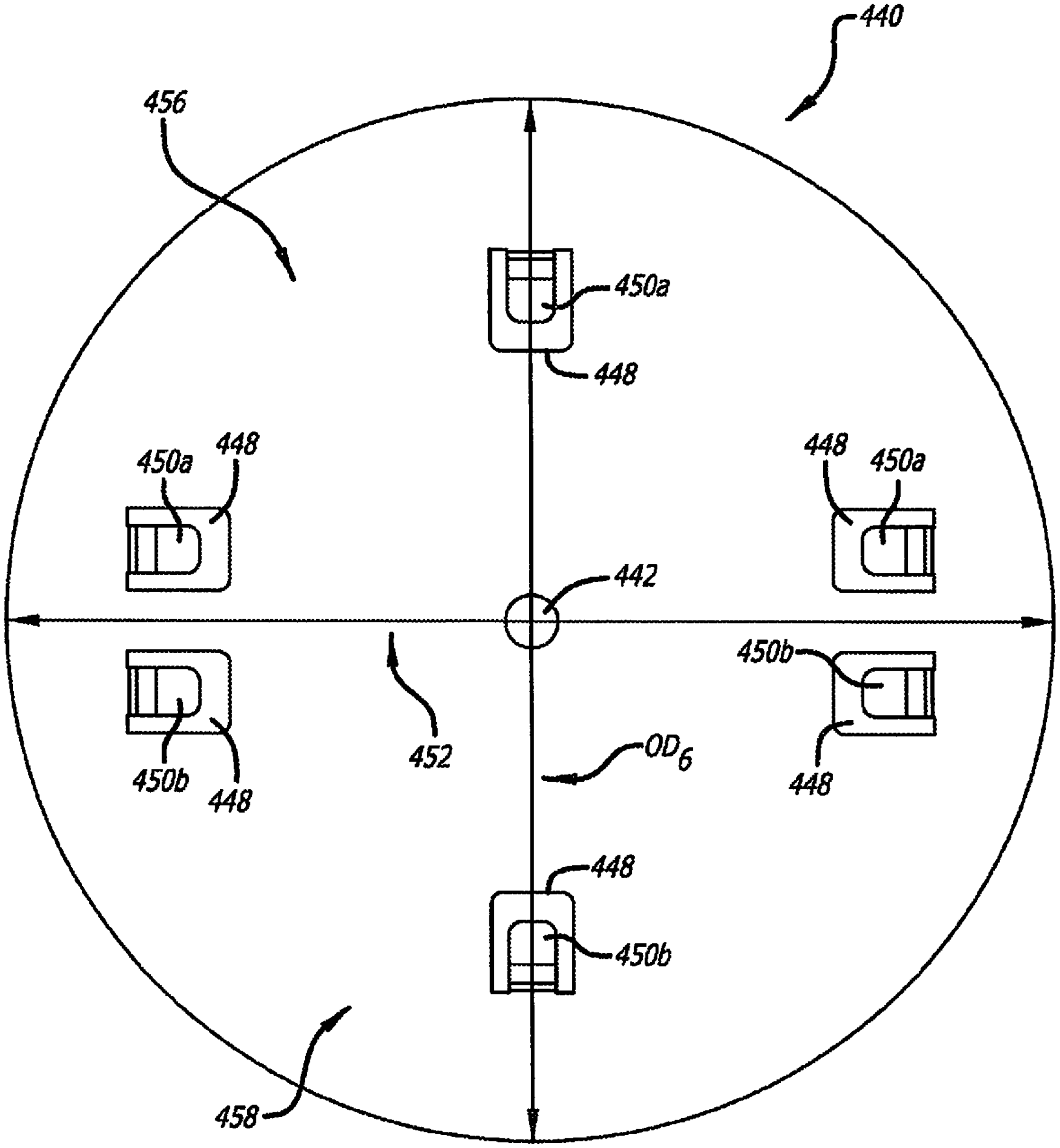
FIG. 26 illustrates a plan view of the constraint plate of FIG. 23.
Figure 27:
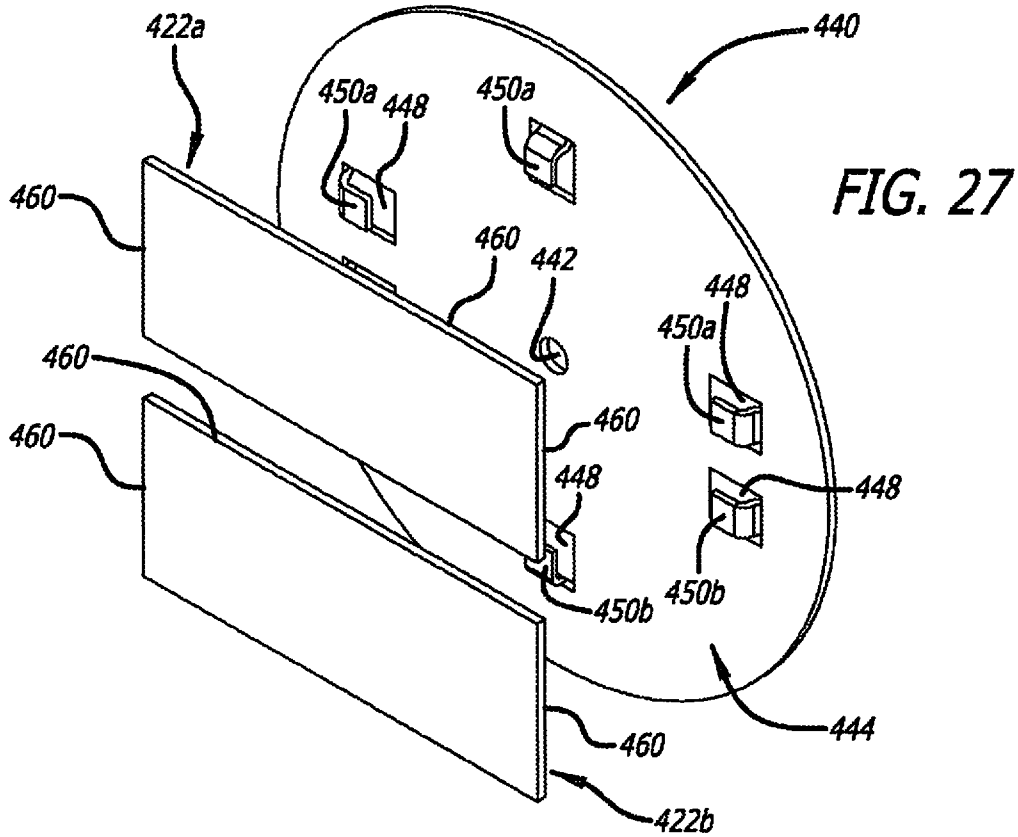
FIG. 27 illustrates a front perspective view of the constraint plate with the intumescent strips exploded therefrom.
Figure 28:
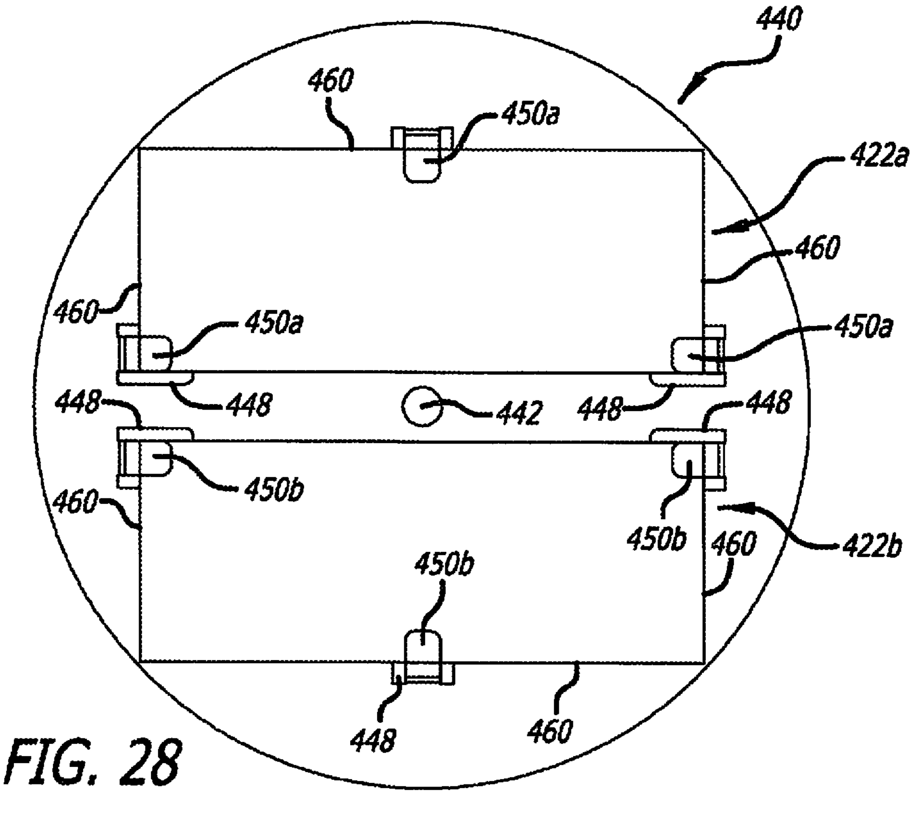
FIG. 28 illustrates a plan view of the constraint plate of FIG. 26 with the intumescent strips secured thereon by the retention fingers.

Turning to FIGS. 26-28, an outer diameter OD6 of the constraint plate 440 may have similar sizes to those described above with reference to the outer diameter OD5 of the constraint plate 340. FIGS. 29-30 depict other example constraint plates 440*a*, 440*b* that can be sized to correspond with covers 402*a* 402*b* in accordance with the principles of the present disclosure. The constraint plates 440*a*, 440*b* also include the retention fingers 450 at recess openings 448.

A center line 452 passes through a center 454 of the constraint plate 440 to define the outer diameter OD6. The center line 452 can divide the constraint plate 440 into a first half 456 and a second half 458. The constraint plate 440 can have a first set of retention fingers 450*a* for retaining a first intumescent strip 422*a* on the first half 456 and a second set of retention fingers 450*b* for retaining a second intumescent strip 422*b* on the second half 458. The retention fingers 450 can be configured to compress the intumescent strips 422 against the front side 444 of the constraint plate 440 to hold the intumescent strips 422 in position prior to expansion. It will be appreciated that the retention fingers 450 do not hinder or prevent the intumescent strips 422 from expanding when exposed to heat. As such, the intumescent material 422 may expand between a rear side 406 of the cover 402 and the front side 444 of the constraint plate 440.

In certain examples, the retention fingers 450 may be positioned along the center line 452. In certain examples, the retention fingers 450 may be positioned on opposite sides of the center line 452. The retention fingers 450 can secure an edge portion 460 (e.g., a side) of the intumescent strips 422*x* to hold and compress the intumescent strips 422*x* against the front side 444 of the constraint plate 440. In other examples, the intumescent strips 422*x* may be bonded to the front side 444 of the constraint plate 440.

Turning to FIGS. 31-32, the retention fingers 450 may include a leg portion 462 that generally extends perpendicularly relative to the front side 444 of the constrain plate 440, a bridge portion 464 that extends horizontally relative to the constraint plate 440 and an elbow portion 466 between the leg portion 462 and the bridge portion 464. The bridge portion 464 of the retention fingers 450 can extend horizontally above the front side 444 of the constraint plate 440 to define a space 468 for receiving the edge portion 460 of the intumescent strips 422*x*. It will be appreciated that the retention fingers 450 can be configured to mount around any one of the sides or edge portions of the intumescent strips 422*x* to secure the intumescent strips 422*x* to the constraint plate 440.

From the forgoing detailed description, it will be evident that modifications and variations can be made without departing from the spirit and scope of the disclosure.

What is claimed is:

1. A fire rated cleanout cover assembly for covering a cleanout access opening comprising: a cover having a front side and a rear side, the cover defining an opening for receiving a fastener, the fastener securing the fire rated cleanout cover assembly to a cleanout plug of a cleanout tee and mounting the cover externally on an outer surface of a fire rated wall structure over the cleanout access opening; and intumescent material pre-incorporated with the cover prior to installation of the cover over the cleanout access opening.

2. The fire rated cleanout cover assembly of claim 1, wherein the intumescent material includes a plurality of intumescent strips each having at least a first surface that adhesively adheres to the rear side of the cover.

3. The fire rated cleanout cover assembly of claim 1, wherein the intumescent material includes a continuous intumescent ring.

4. The fire rated cleanout cover assembly of claim 1, wherein the intumescent material includes an intumescent pad.

5. The fire rated cleanout cover assembly of claim 1, further comprising a constraint plate.

6. The fire rated cleanout cover assembly of claim 5, further comprising a spacer for spacing the constraint plate axially from the cover.

7. The fire rated cleanout cover assembly of claim 6, further comprising constraint plate adjustment members threaded on the fastener in a front and in a back of the constraint plate for adjusting an axial position of the constraint plate on the fastener relative to the cover.

8. The fire rated cleanout cover assembly of claim 7, wherein, when the intumescent material is exposed to heat, the intumescent material expands and is positioned axially between the rear side of the cover and the front of the constraint plate.

9. The fire rated cleanout cover assembly of claim 5, wherein the intumescent material is positioned at a front surface of the constraint plate.

10. The fire rated cleanout cover assembly of claim 7, wherein the intumescent material is removable with the cover from the cleanout access opening for maintenance access without being damaged, without compromising a fire rating of the cover upon re-installation of the cover, and without requiring re-application of the intumescent material.

11. The fire rated cleanout cover assembly of claim 10, wherein the intumescent material is adhered to a planar inner surface of the cover within a recessed region at the rear side of the cover.

12. The fire rated cleanout cover assembly of claim 11, wherein the intumescent material is radially inwardly offset from a rearwardly angled peripheral flange of the cover.

13. A method for assembling a fire rated cleanout cover assembly, comprising:

affixing intumescent material to a cover of the fire rated cleanout cover assembly prior to installation of the fire rated cleanout cover assembly;

securing the fire rated cleanout cover assembly to a cleanout plug of a cleanout tee; and mounting the cover externally on an outer surface of a fire rated wall structure over the cleanout access opening.

14. The method of claim 13, further comprising a step of attaching a constraint plate to the cover, wherein the intumescent material is positioned between a rear side of the cover and a front of the constraint plate.

15. The method of claim 13, wherein the fire rated cleanout cover assembly is adapted to constrain the intumescent material axially between the cover and the constraint plate during expansion of the intumescent material such that the intumescent material expands radially.

16. The method of claim 13, wherein the intumescent material includes a plurality of intumescent strips.

17. The method of claim 13, wherein the intumescent material includes a continuous intumescent ring.

18. The method of claim 15, wherein the intumescent material is adhered to a planar inner surface of the cover within a recessed region at a rear side of the cover.

19. The method of claim 18, wherein the intumescent material is radially inwardly offset from a rearwardly angled peripheral flange of the cover.

20. A method for assembling a fire rated cleanout cover assembly, the fire rated cleanout cover assembly including a cover having intumescent material pre-incorporated with the cover and a constraint plate, the method comprising:

securing the fire rated cleanout cover assembly to a cleanout plug of a cleanout tee and mounting the cover externally on an outer surface of a wall structure over a cleanout access opening such that the intumescent material surrounds a perimeter of the cleanout access opening, the intumescent material being adapted to expand upon exposure to heat to seal the cleanout access opening; and constraining the intumescent material between the cover and the constraint plate during expansion of the intumescent material such that the intumescent material expands radially.

21. The fire rated cleanout cover assembly of claim 5, wherein the constraint plate defines a plurality of recess openings that each include a retention finger.

22. The method of claim 14, wherein the constraint plate defines a plurality of recess openings that each include a retention finger for holding the intumescent material against the front of the constraint plate.

23. The method of claim 20, wherein the constraint plate defines a plurality of recess openings that each include a retention finger for holding the intumescent material against the constraint plate.

* * * * *